April 28, 1953    J. LOUMIET ET LAVIGNE    2,636,846
DISTILLING PROCESS AND APPARATUS
Filed March 30, 1946      13 Sheets-Sheet 1

Inventor
JUAN LOUMIET ET LAVIGNE
By Moses, Nolte, Crews & Berry
Attorneys

April 28, 1953   J. LOUMIET ET LAVIGNE   2,636,846
DISTILLING PROCESS AND APPARATUS
Filed March 30, 1946   13 Sheets-Sheet 2

Fig. 2.

Inventor
JUAN LOUMIET ET LAVIGNE
By Moses, Nolte, Crews & Berry
Attorneys

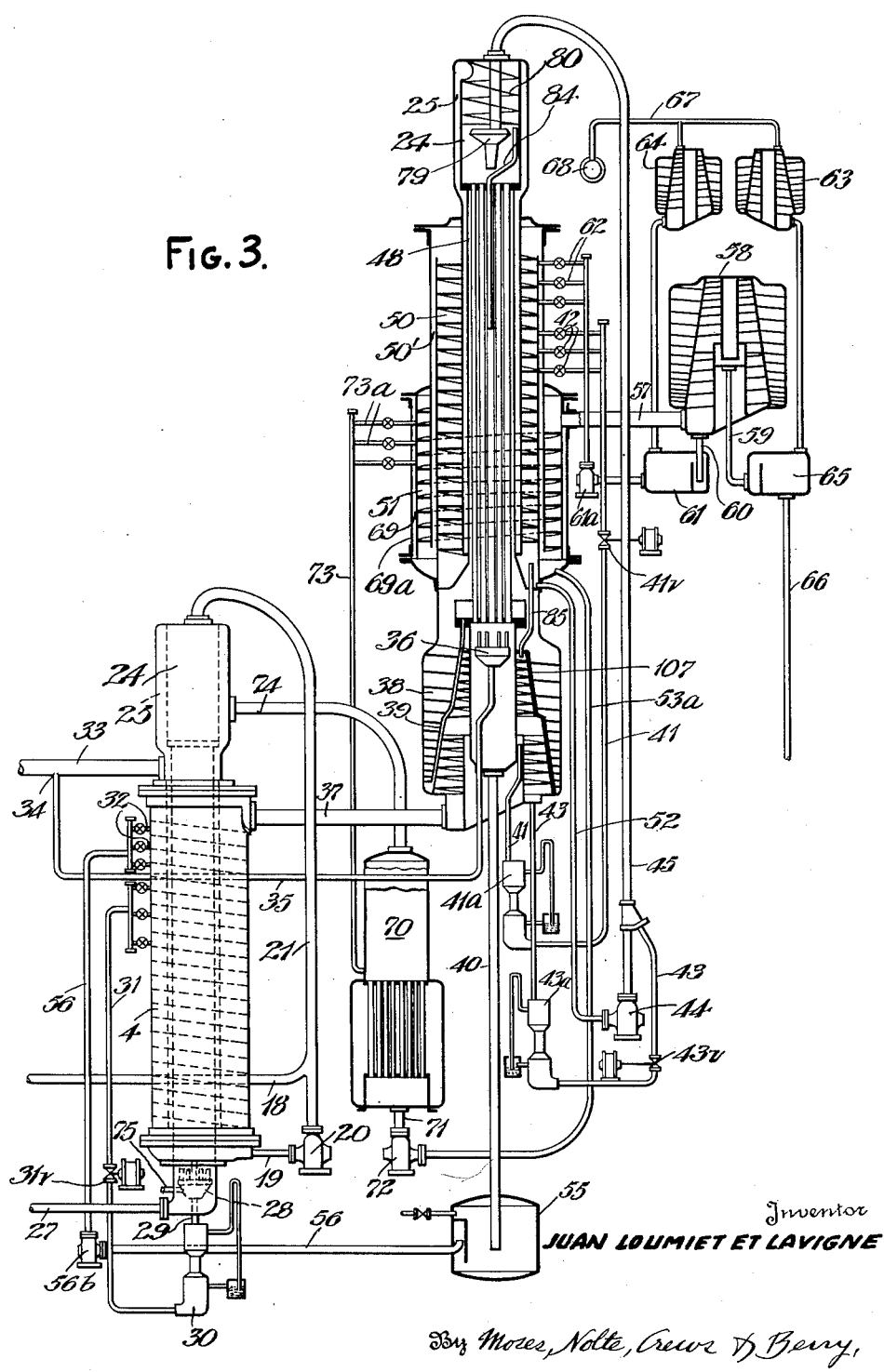

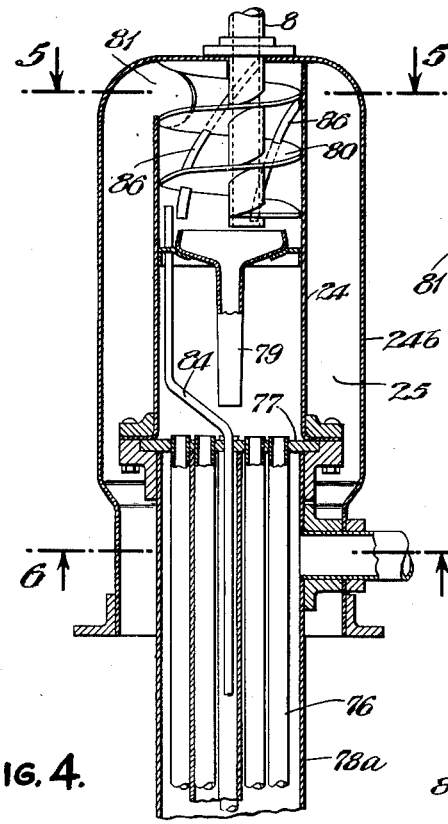
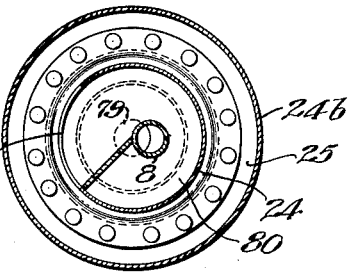
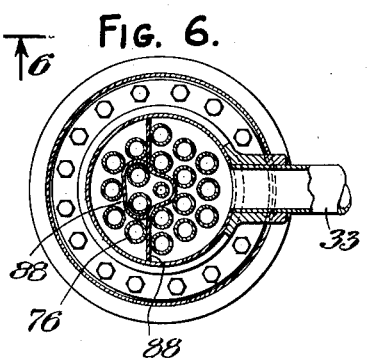
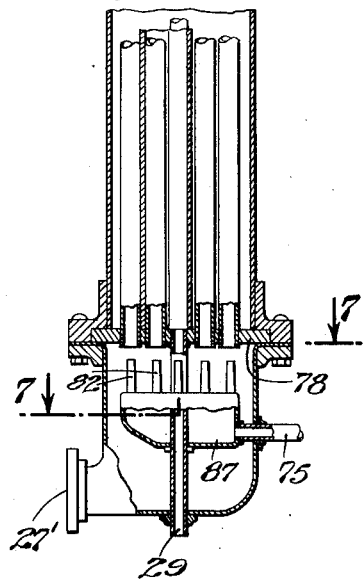
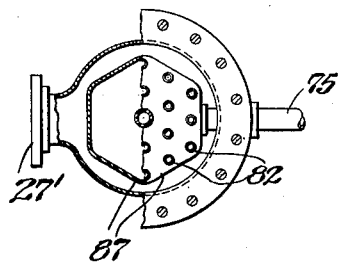
Inventor
JUAN LOUMIET ET LAVIGNE
By Moses, Nolte, Crews & Berry
Attorneys

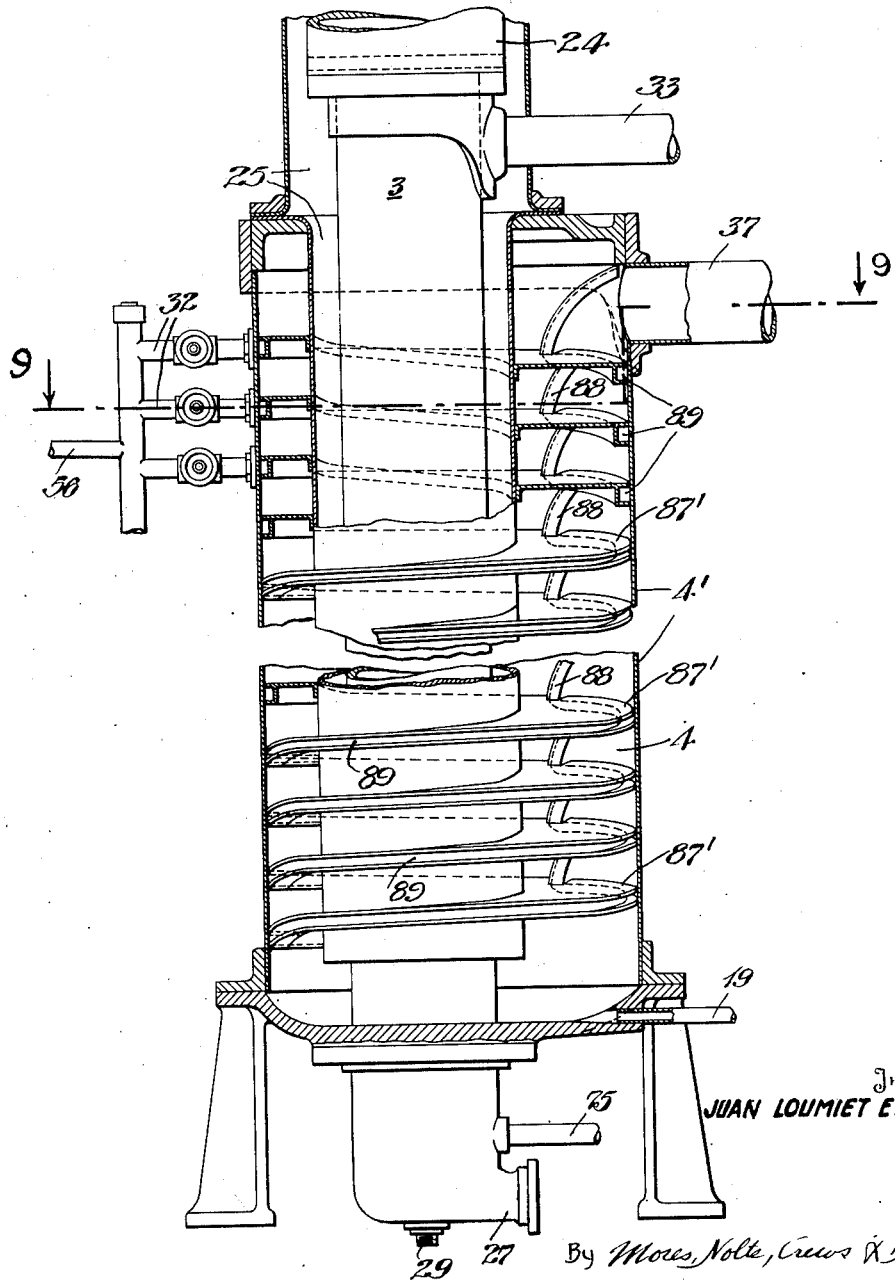

April 28, 1953　　　J. LOUMIET ET LAVIGNE　　　2,636,846
DISTILLING PROCESS AND APPARATUS
Filed March 30, 1946　　　　　　　　　　　　　　13 Sheets-Sheet 6
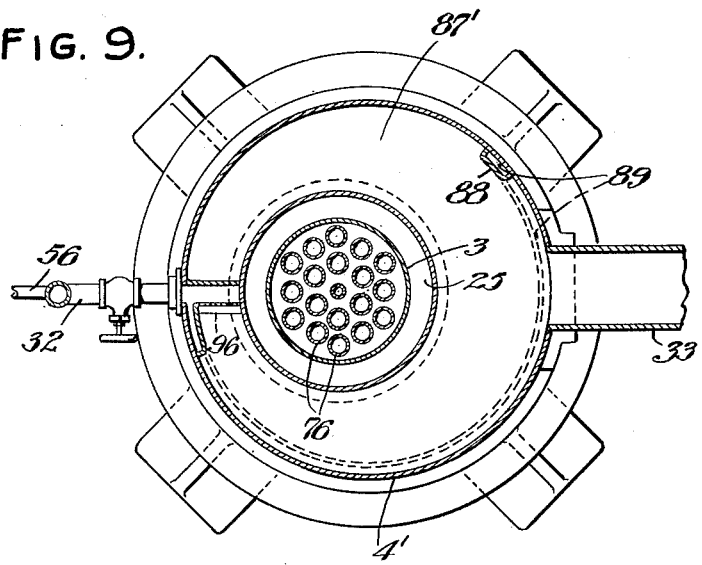
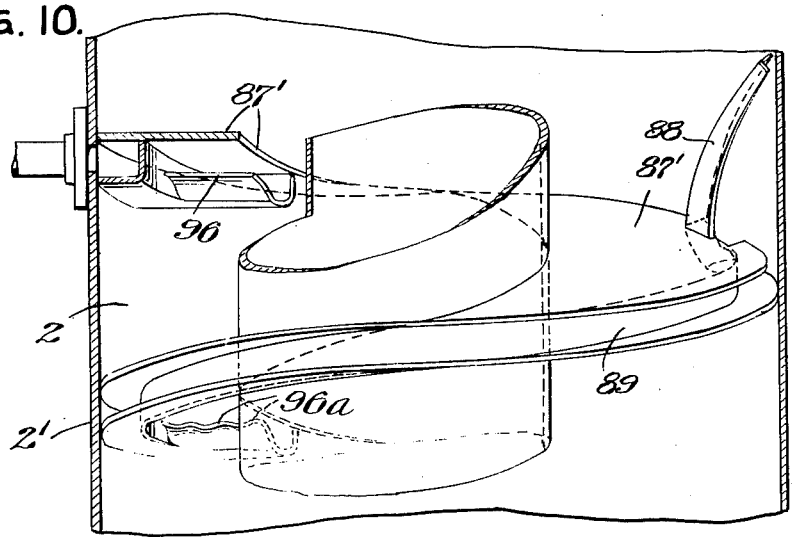
Inventor
JUAN LOUMIET ET LAVIGNE
By Moses Nolte Crews & Berry
Attorneys

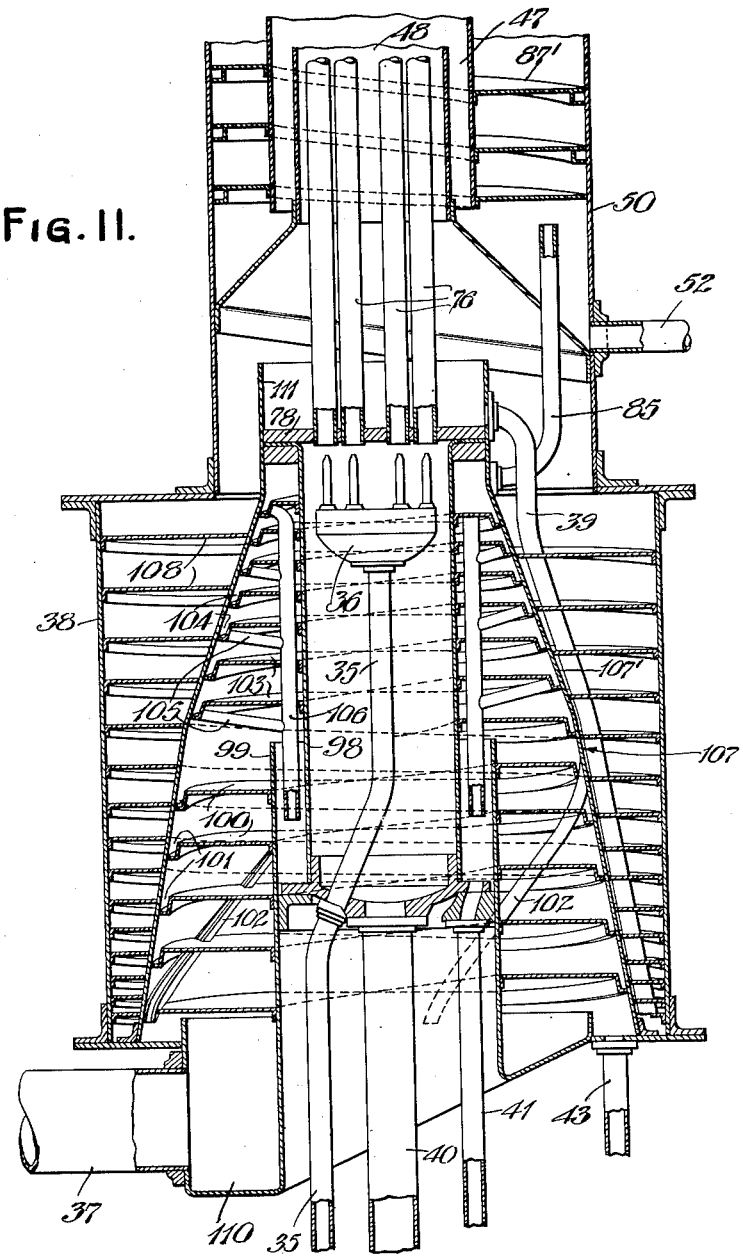

April 28, 1953 J. LOUMIET ET LAVIGNE 2,636,846
DISTILLING PROCESS AND APPARATUS
Filed March 30, 1946 13 Sheets-Sheet 9

Inventor
JUAN LOUMIET ET LAVIGNE

By Moses, Nolte, Crews & Berry
Attorneys

April 28, 1953  J. LOUMIET ET LAVIGNE  2,636,846
DISTILLING PROCESS AND APPARATUS
Filed March 30, 1946  13 Sheets-Sheet 12

INVENTOR.
JUAN LOUMIET ET LAVIGNE
BY
Moses, Nolte, Crews & Berry
ATTORNEYS

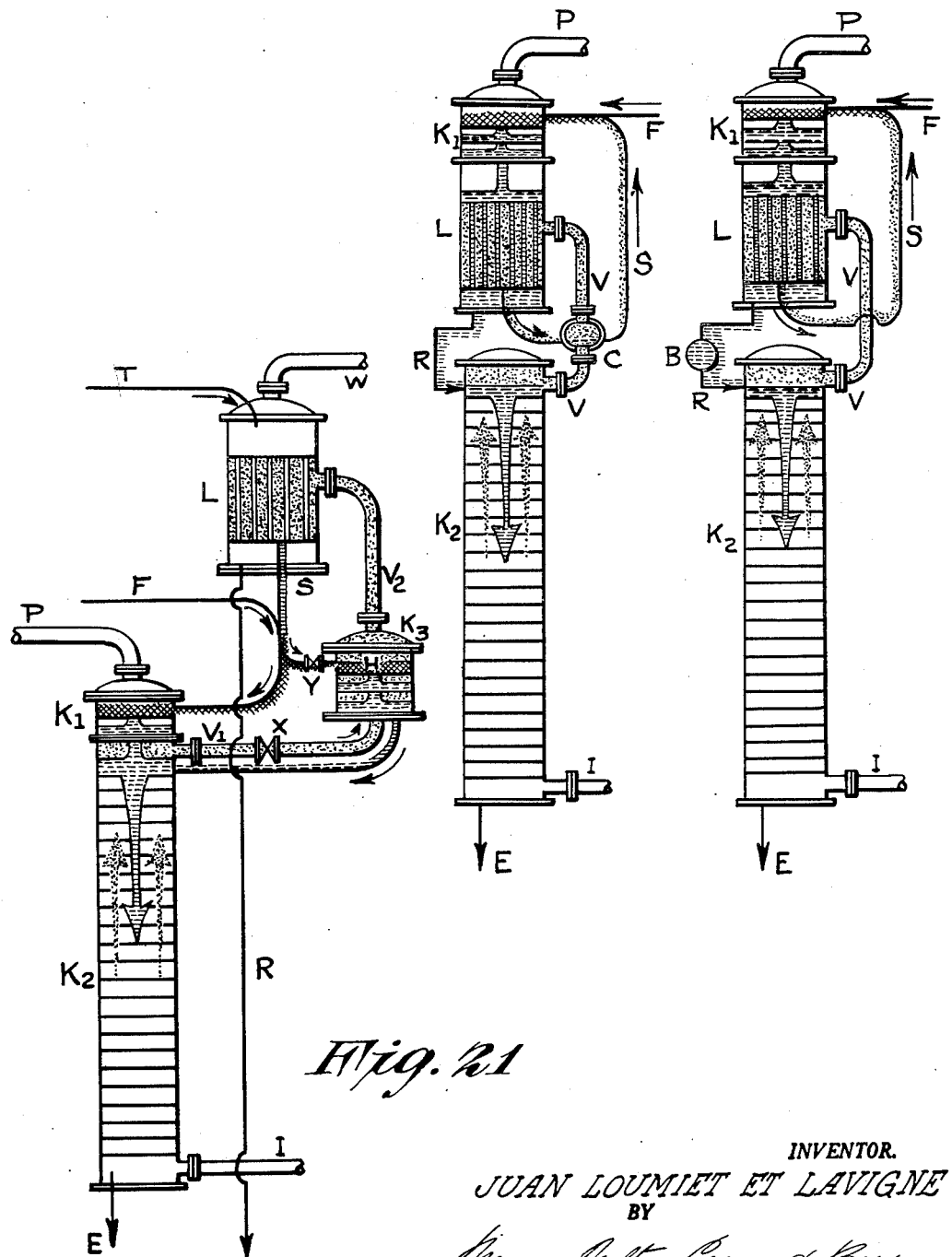

_Patented Apr. 28, 1953_                                                                2,636,846

UNITED STATES PATENT OFFICE 2,636,846

DISTILLING PROCESS AND APPARATUS

Juan Loumiet et Lavigne, Itabo, Cuba

Application March 30, 1946, Serial No. 658,508
In Cuba April 4, 1945

24 Claims. (Cl. 202—41)

This invention relates to a distillation process and the apparatus for carrying it out. More specifically, it refers to processes for operating on a liquid theoretically constituting a binary mixture, in order to extract therefrom, by distillation, its most volatile components; even though, in actual practice, such a binary mixture comprises, in addition to the two fluids theoretically considered for extraction, certain other impurities which are eliminated through processes complementary to the general method of distillation.

Since the principal application of the process is to the production of ethyl alcohol, the present description is related to wine distillation; but it will be apparent that the methods and apparatus described are equally applicable to the distilling of other binary mixtures, capable of distillation.

It is the principal object of the invention to diminish the amount of steam required to evaporate alcohol, and to reduce the cost of heating for distillation.

The second object of the invention is to attain or obtain an economy of heat, by reducing the amount of water evaporated together with the evaporated alcohol, when it is issuing from the exhausting column to enter into the enrichment column, for which purpose the strength of the liquid feeding the upper plate of the exhausting column is raised, by mixing the feeding liquid with another liquid of greater strength. Such a liquid of greater strength is brought to the vapor stage of the said exhausting column, or be it, of the vapor ascending in said column, which is thus liquefied before being injected into the upper plate of the same exhausting column.

A third object of the invention is to avoid the losses of heat which would be represented for said column by the extraction of vapor of the exhausting column and the re-entrance of said fluid at liquid state in said column. To attain this, the heat given off by said vapor in its liquefaction is reincorporated into the column. Such reincorporation requires that the vapor, at the moment of its liquefaction, be at a temperature higher than that of the liquid going through the exhausting column, so that said liquid can absorb the latent heat of vaporization given off in such condensation. This result could be obtained by the compression of said vapor; but the invention adopts, with preference, the system of recuperation of the heat applied in multiple-effect evaporating apparatus, for which purpose the exhaustion of the feeding liquid is divided into two progressive phases, each phase operated in a different apparatus and at a different pressure and temperature; the entirety of said apparatus constituting the exhausting column which is traversed, from the apparatus of lowest pressure to the apparatus of greatest pressure, by the feeding liquid, which feeding liquid is successively distilled in each one of said apparatus and, by reason of such progressive distillations, is stripped of its more volatile components, being totally exhausted when reaching the bottom of the apparatus of greatest pressure. The vapor produced in one of these apparatus, A, is sent to the calandria of the heat exchanger which terminates, at its bottom the next proximate apparatus of lesser pressure, B, where, at the same time that it condenses, it provokes in the liquid of said apparatus the evaporation thereof, or be it, the constitution of a new vapor of distillation which can compensate it, and in this manner reincorporates into the exhausting column, in the phase of apparatus B, its latent heat of vaporization, contained in a distillation vapor that substitutes it. In this manner, from phase to phase, the flow of heat and the ascending vapor produced in the phase of greatest pressure by reason of the initial heating induced by steam, are maintained.

A fourth object of the invention consists in improving, without expenditure of heat, the strength of the vapors produced in the phases where the exhausted liquid operated upon is poorer (leaner) than the feeding liquid. For this purpose the rectification of the vapor produced by the exhausted liquid is effected by applying, as rectifying liquid, the feeding liquid.

A fifth object of the invention consists in improving the processes above described when referring to the second object of the invention. Instead of mixing the condensations of the vapors extracted from the exhausting column with the feeding liquid in the upper plate of the exhausting column, such condensates are injected into the enrichment column so as to rectify the vapors produced by the exhausting column; such injection being effected at a level of the enrichment column where the ascending vapor is sensibly in equilibrium separation with such condensations, or, at a slightly lower level. In this manner it is possible to improve the strength of the vapor issuing from the exhausting column, and it is also possible to attain that the alcohol contained in the condensations applied as rectifying liquid, be in a great measure distilled without expenditure of heat.

A sixth object of the invention consists in reducing the interval between the maximum and minimum of temperature of the calandrias heated by the condensation of the vapors of distillation of the phases of greater pressure. For this purpose fractional condensation is applied to such vapors of distillation; and the heat given off in the production of the condensations of greatest volatility is applied to operations carried out at lesser temperature. In this manner it is also possible to separate richer liquids, in said condensation operations.

A seventh object of the invention consists in providing a distilling rectifying liquid answering the requirements of the heat exchanger used to terminate the evaporating apparatus, in accordance with the third object of the invention, capable of operating at relatively high pressures and temperatures, of being heated simultaneously by two vapors which should not mix, and of allowing extraction and injection of the liquid operated at appropriate levels.

An eighth object of the invention is to provide a rectifying apparatus that will perform the requirements of the invention, capable of operating at relatively high pressure and temperature, and in accordance with the process covered by my previous Patent #2,182,566.

For further objects and for a better understanding of the invention, reference may be had to the following detailed description taken in connection with the accompanying drawing, in which Fig. 1 is a schematic layout of an alcohol distillation plant embodying the features of the present invention;

Figs. 2 and 3 are schematic views of another alcohol distillation plant embodying the features of the present invention and comprising three exhaust columns and one enrichment column, the number three exhaust column of Fig. 2 being duplicated in Fig. 3 and showing the connection with the enrichment column;

Fig. 4 is a cross-sectional view, in elevation, of one of the distilling-rectifying units;

Figure 12:
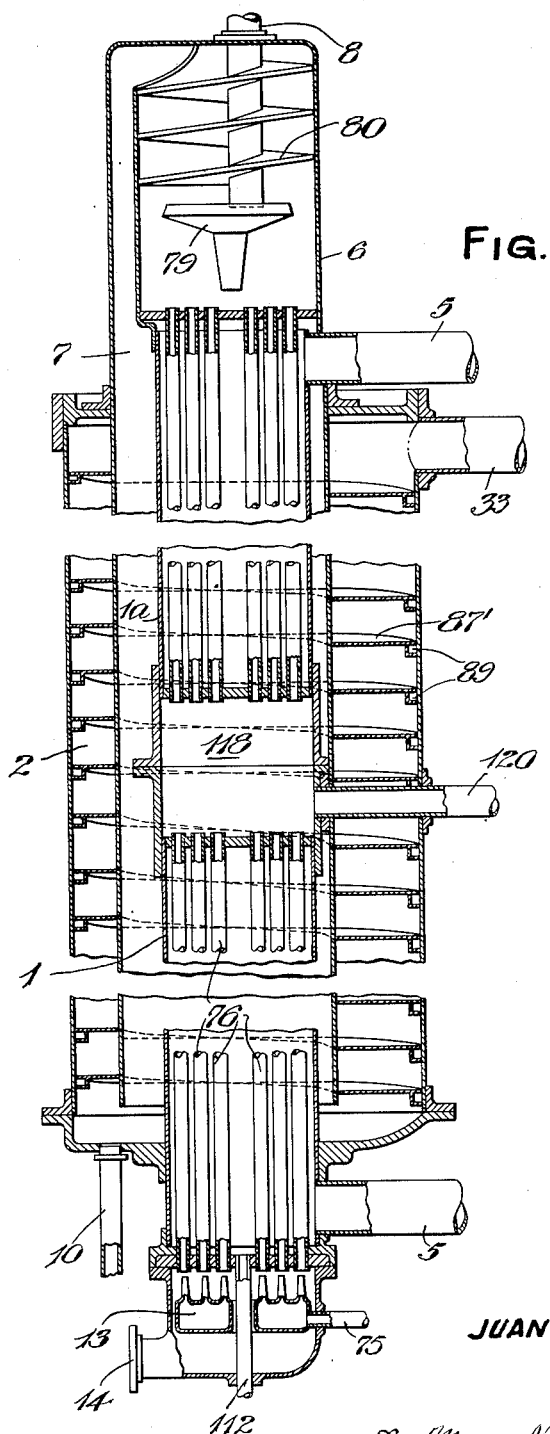
Figure 13:
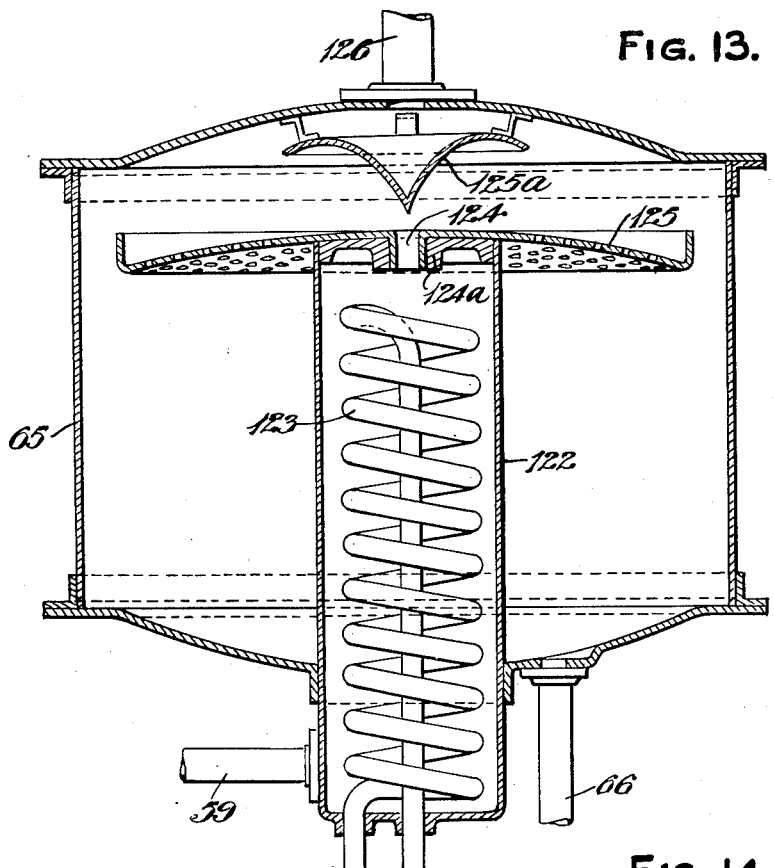
Figure 14:
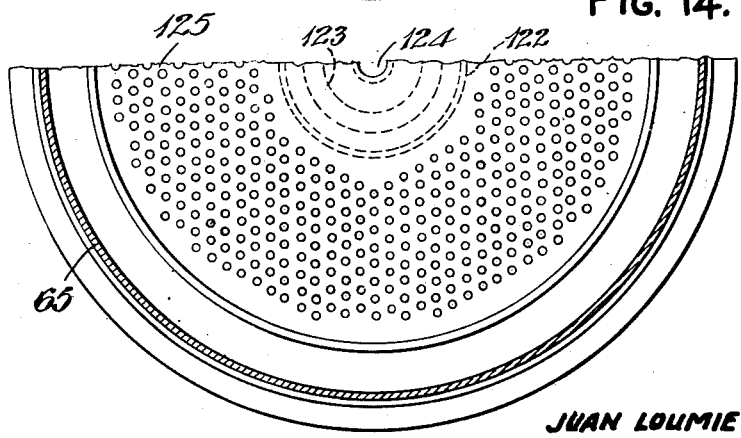
Figure 15:
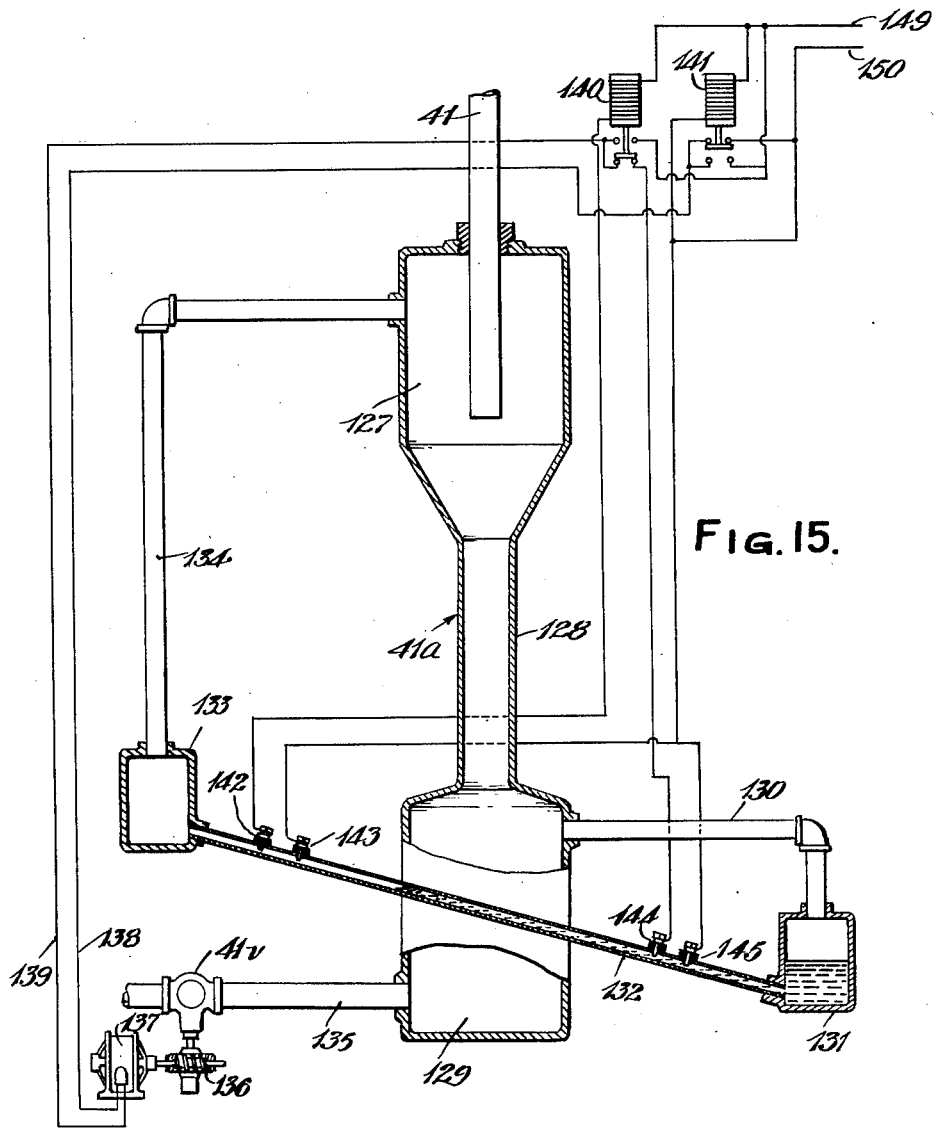
Figure 16:
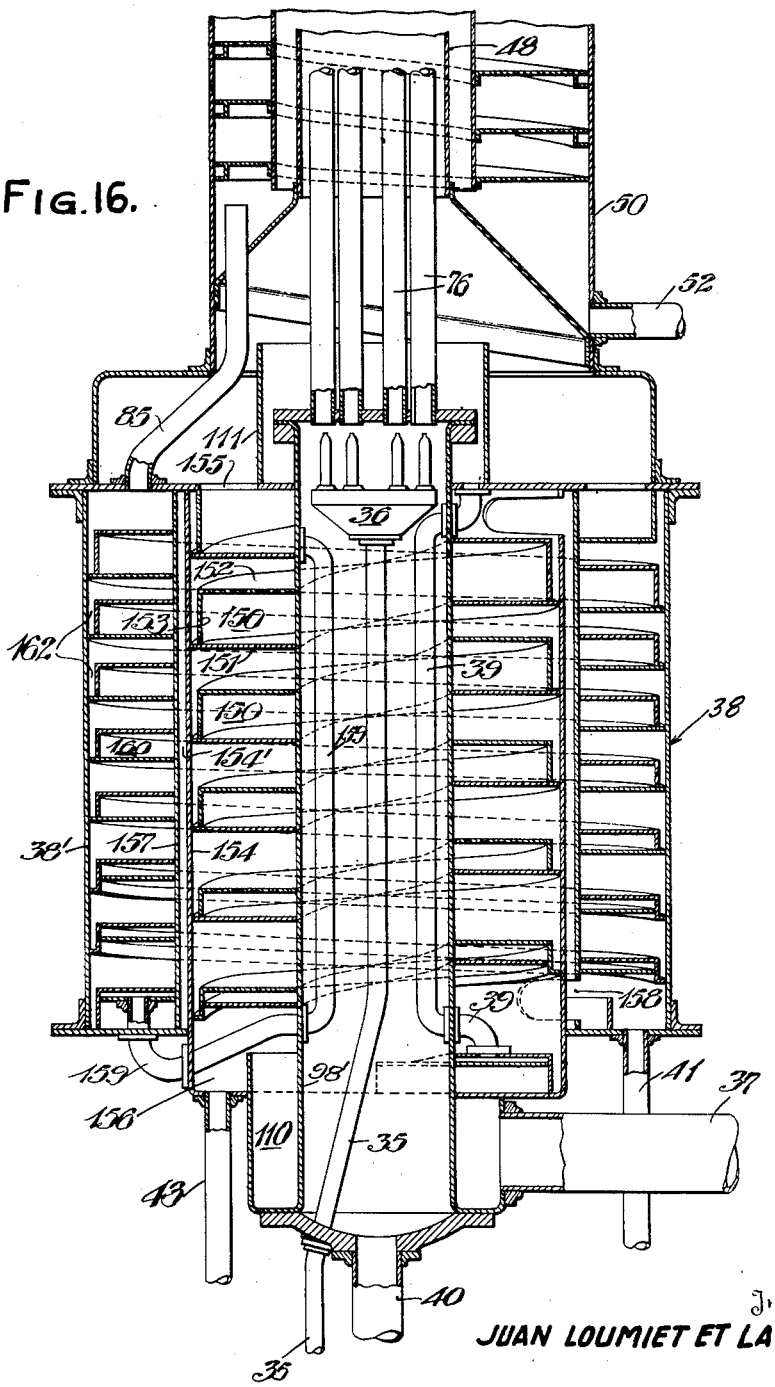

Figs. 5, 6 and 7 are respectively transverse sectional views of the distilling rectifying unit taken along the lines 5—5, 6—6 and 7—7 of Fig. 4;

Fig. 8 is a cross-sectional view, in elevation, of a rectifying unit;

Fig. 9 is a transverse sectional view taken along the line 9—9 of Fig. 8;

Fig. 10 is an enlarged fragmentary view, partly in section, of a portion of the rectifying unit shown in Fig. 8;

Fig. 11 is a cross-sectional view, in elevation, of a condenser used in carrying out the present invention;

Fig. 12 is a cross-sectional view, in elevation, of still another type of distilling rectifying unit;

Fig. 13 is a cross-sectional view, in elevation, of a separator used in carrying out the present invention;

Fig. 14 is a fragmentary plan view, looking into the separator when the cover thereof has been removed;

Fig. 15 is a diagrammatic view of one of the regulators;

Fig. 16 is a cross-sectional view, in elevation, of still another type of condenser which may be used in connection with the present invention.

Figs. 17 to 21, inclusive, show in elevation various simple diagrammatic forms of apparatus, and procedures carried out with the aid of such apparatus in accordance with the present invention.

Figure 1:
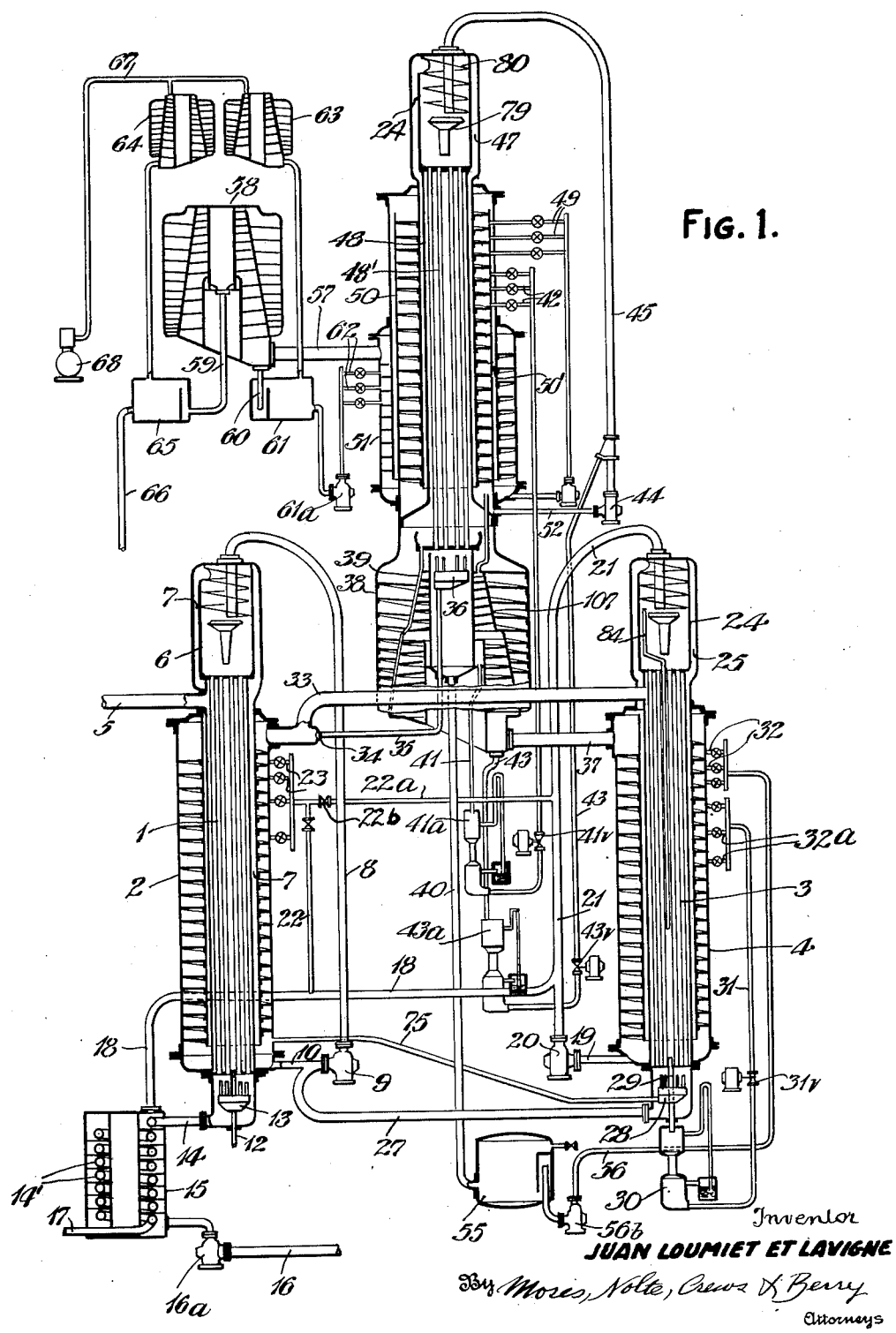

In Fig. 1, there is shown a distillation plant of three columns, arranged with one above the other two. The upper one is the enrichment column while the two lower ones constitute exhaust columns. These columns have respectively, starting with the lower ones from left to right and then the upper one, distilling-rectifying units 1, 3 and 48. The two lower columns further include respectively, rectifying units 2, 4 while the upper column alone includes two rectifying units 50, 51.

The wash enters the system through tube 16 and is forced by a pump 16a into a heat recuperator 15 through which it is circulated in a counter-current direction to the passage of the lees therethrough. Heat is absorbed from the lees and the wash leaves the recuperator in a heated condition through the outlet tube 18. Branch tube 22 leads from tube 18 to supply rectifying unit 2 of the left lower column with wine and tube 21, which is an extension of the tube 18, delivers the balance of the wine to the distilling-rectifying unit 3 of the right lower column. The wine enters dome 24 and passes downwardly along the tubes of unit 3 and gives up some of its alcohol. The treated wine then leaves the column through the tube 27 and is forced by pump 9 into tube 8 which delivers it to dome 6 of the distilling-rectifying unit 1 of the left lower exhaust column. At the same time the wine which has proceeded down the rectifying unit 2 is drawn from the bottom through tube 10 by the same pump 9 and joined with the treated wine coming through tube 27 for delivery to unit 1. The distilling-rectifying unit 1 is heated by steam delivered thereto by tube 5. The wine continues down the unit 1 and in doing so is completely divested of its alcohol. As the exhausted wine reaches the bottom of the unit, lees are formed which are led off by tube 14 and directed to coil 14' within the recuperator 15 wherein its heat is transferred to the entering wine from tube 16. The cooled lees leave the coil 14' through the outlet tube 17.

Through tube 12, steam is injected into the bottom of the unit 1 and distributed to all the tubes of the unit to form in each tube a deposit of vapor which grows in volume and in alcoholic strength as it moves up the tube. The vapor from the tubes joins in the dome 6 and is removed to the bottom of the rectifying unit 2 through an annular passage 7, and treated in a manner which will be set forth when describing Figs. 8, 9, 10. The wine or rectifying liquid for rectifying unit 2 from tube 22 can be admitted to the unit at different levels or turns of an internal helix as shown by the several valve-controlled inlet tubes 23. Mixed vapors of alcohol and water resulting from the rectification leave unit 2 through tube 33 and are directed to the distilling-rectifying unit 3 of the right lower exhaust column. The slight amount of the mixed vapors which is not condensed is reunited with the vapor issued from the exhaustion unit 3 by way of tube 84 before entering the rectifying unit 4 of the right lower column, all in a manner to be described more in detail when discussing Fig. 4.

The vapors rise into the dome 24 of the unit 3 and are conducted through an annular passage 25 to the bottom of the rectifying unit 4 and are rectified as they pass upwardly through the unit 4. The rectifying liquid for rectifying unit 4 is supplied by the distilling-rectifying unit 3, which is the condensed heating fluid which had entered the top of the unit 3 by way of tube 33 from the left column, and this liquid leaves the bottom of unit 3 through tube 29 and is led to a regulating apparatus 30 which controls the admission of the liquid to the rectifying unit 4, and passes from the apparatus 30 to the unit 4 by way of tube 31 and through valve controlled tubes 32a which provide means by which the liquid can be distributed between turns of the internal helix of the unit 4.

A supplemental rectifying liquid for unit 4 is supplied with condensates or residues from distilling rectifying unit 48 of the upper or enrichment column. This supplemental liquid passes from the unit 48 through a tube 40 to a separator 55 where it is deprived of oil and by pump 56b is forced along tube 56 to valve-controlled tubes 32 which distribute the liquid between the top turns of the helix.

When the rectifying liquids arrive together at the lower part of the unit 4 they are drawn through a tube 19 and forced by a pump 20 along wine supply tube 21 and into the upper part of the distilling-rectifying unit 3. As the liquids pass up the tube 21 they are mixed with wine coming from tube 18. Part of the mixture can be delivered through tube 22a to tube 22 to enrich the wine being delivered to rectifying unit 2 of the lower left column, the flow being controlled or selected by a valve 22b.

The vapor from rectifying unit 4 is passed through tube 37 to a rectifying condenser at the bottom of the enrichment column where two grades of condensate are singled out, the condensate with less alcohol content being withdrawn through tube 43 while the other condensate with the greater alcohol content is withdrawn through the tube 41.

The withdrawal of the low content condensate is controlled by a regulator 43a from which it is conveyed past a motor-operated valve 43v to tube 45 and mixed with rectified products taken from rectifying unit 50 by tube 52 and together the mixed fluids are forced by pump 44 through tube 45 to the upper part of the distilling-rectifying unit 48 of the upper or enrichment column. The withdrawal of the second condensate through tube 41 is controlled by regulator 41a from which the condensate is passed through a motor-operated valve 41v and valve-controlled distributing tubes 42 to upper helix turns of rectifying unit 50 of the upper column.

The vapor produced in the distilling rectifying unit 48 descends through the annular space 47 which separates unit 48 from the rectifying unit 50 and then upwardly through the rectifying unit 50. Also, directed to the rectifying unit 50 through valve controlled tubes 49 are products of the rectifying liquid of rectifying unit 51.

The vapor which is produced in the rectifying unit 50 is passed downwardly to the bottom of rectifying unit 51, through an annular space 50' provided between the units, and then upwardly through the unit 51. The rectifying liquid for unit 51 is obtained from tank 61. This liquid is withdrawn by pump 61a and forced to valve-controlled distributing tubes 62 for entry to different upper turns of the helix within unit 51.

The vapor produced in unit 51 leaves the unit through tube 57 and is passed to a fractional condenser 58. Condensate with less alcohol content is drained through tube 60 into the tank 61, where it is subjected to a boiling action before being supplied to unit 51. Vapors extracted by boiling action in tank 61 are passed upwardly to another condenser 63 where they are condensed and from which residue vapors are extracted through tube 67 by vacuum pump 68.

The condensate from the upper part of the fractional condenser 58 having the high alcohol content descends through tube 59 to tank 65 where it is subjected to spontaneous boiling action. The purified alcohol is withdrawn from the tank 65 through the tube 66 for consumption. The gases or vapors resulting from the boiling action in tank 65 are delivered to a condenser 64 and such gases or vapors that are not condensed therein are extracted with the vapors from condenser 64 through tube 67 by vacuum pump 68. To supplement vacuum pump 68, a condenser of lower temperature and separators may be used to extract from the non-condensable gases or vapors, carry-overs which may be utilized for industrial purposes.

The steam injected into the base of the distilling-rectifying units of each of the columns is provided in the following manner. In the left lower column, steam is injected into the distilling-rectifying unit 1 by the tube 12 and a distributing box 13. The vapor for the distilling-rectifying unit 3 of the right lower column is taken from the lower part of the rectifying unit 2 of the left lower column, the delivery being made through tube 75 and a distributing box 28. The distilling-rectifying unit 48 of the upper column is supplied from the vapor produced in the rectifying unit 2 of left lower column. A tap is made at 34 upon the outlet tube 33 and the vapor is withdrawn through the tube 35 and delivered to a distributing box 36.

Condenser 107 at the bottom of the upper column is cooled by the boiling water in the surrounding evaporator 38. The steam from the boiling water in the evaporator 38 traverses the distilling-rectifying unit 48 and passing heat to the tubes 48' evaporates such liquid descending along them. The condensations of the steam upon the tubes 48' of the unit 48 are returned to the lower part of the evaporator 38 through tube 39 and in a manner to be described more in detail later on.

Generally, throughout the process, the return of the liquids is always made back to points where the liquid in operation is of like alcoholic content. However, without much harm they may be returned to liquids of less alcoholic content, but never should the liquids of less alcoholic content be returned to points where the liquid may be of greater alcoholic content.

Referring now to Figs. 2 and 3, there is shown a plant of quadruple construction and comprising three exhaust and one enrichment column. The enrichment column has two rectifying units, with one of which a salt solution is used, according to a technique previously described. The exhaust column shown at the lower left of Fig. 3 is column 3 of Fig. 2 but showing different tube connections.

Wine wash is forced by a pump 16a through tube 16 into the heat recuperator 15. It leaves recuperator 15 by way of tube 18 and is distributed by branch tube 22 to the rectifying unit 2 of the first column, by branch tube 18a to the distilling-rectifying unit 3a of the second column and the balance continues through tube 18 to the distilling-rectifying unit 3 of the third column.

The distilling-rectifying unit 2 of the first column is fed by the exhaust liquid from unit 3a of the second column through tube 27a and from unit 3 of the third column through tubes 27 and 27b which join with tube 27a to deliver the combined liquids through tube 8 to unit 2. This delivery is effected by means of a pump 9. A branch tube 10 enters the joined tubes to deliver liquid from rectifying unit 2 of the same column to the pump 9. The flow of liquid in tubes 27a, 27b and 10 is regulated by valves indicated therein.

The distilling-rectifying unit 3a of the second column is fed by the major part of the more impoverished liquid leaving the third column through the tube 27 and as well by the returns from rectifying unit 4a of the second column entering tube 27 through valve controlled tube 19a. These liquids are pumped together by pump 20a and directed through tube 21a to the top of the distilling-rectifying unit 3a of the second column. On the way from the pump 20a to the unit 3a, part of the wine wash to be treated and conducted through valve-controlled tube 18a enters the tube 21a.

The distilling-rectifying unit 3 of the third column is fed by the returns from rectifying unit 4 of the same column which after being conducted through tube 19 are driven by pump 20 into tube 21, fed likewise by the balance of the wine to be treated from tube 18 which joins tube 21 upon reaching the top of the distilling-rectifying unit 3.

Steam is injected into the tubes of the distilling-rectifying units of the columns in the following manner. With the first column steam is delivered by the tube 12 and the distributing box 13. Into the second column, mixed vapors are supplied from rectifying unit 2 of the first column by way of tube 75a and distributing box 23a. The unit 3 of the third column is supplied from the vapors of the rectifying unit 4a of the second column through tube 75 and distributing box 28. The fourth or enrichment column, Fig. 3, is supplied with vapors from the top of the rectifying unit 4a of the second column from tube 33 by a branch tube 35 joining the tube 33 at 34 and conveying the vapors to the box 36.

The rectifying liquid for the rectifying unit 2 of the first column is taken from the wine wash supply tube 18 by way of branch tube 22 and from the liquid being supplied to the distilling-rectifying unit 3a of the second column by way of a valve-controlled tube 22a which joins with tube 22 and distributing tubes 23.

The rectifying liquid for the rectifying unit 4a of the second column is supplied from the distilling-rectifying unit 3a of the same column. The liquid leaves the base 26a through tube 29a and passes to a regulating apparatus 30a and then is led to valve-controlled distributing tubes 32a connected with the top of unit 4a.

The rectifying liquid for the rectifying unit 4 of the third column is supplied from the same column as is unit 4a, that is by way of tube 29, regulating apparatus 30, tube 31, and distributing tubes 32b.

The liquid issuing from the fourth or enrichment column through the tube 40 passes into the separator 55, Fig. 3, where it is purified and is later conducted through tube 56 and driven by pump 56b to valve-controlled distributing tubes 32 on the rectifying unit 4 of the third column.

The fourth or enriching column has the two rectifying units 50 and 51. The unit 50 uses the rich condensate from the condenser 107. The condensate is delivered to the unit 50 through tube 41, regulator 41a, valve 41v and distributing valves 42. Unit 50 also uses some of the alcohol already deposited in the purifying tank 61 and forced by pump 61a through distributing tubes 62 to the higher turns of the unit 50.

The rectifying unit 51 uses a salt having an affinity for water, such as calcium chloride, potassium carbonate, sodium carbonate, sodium acetate, sodium nitrate, and the like. The return products leave the unit 51 through tube 53a and forced by pump 72 through tube 71 to evaporator 70. The residue solution from the evaporator 70 is conducted through tube 73 and distributing tube 73a to the upper turns of the rectifying unit 51. The unit 51 is heated by an external envelope 69 of vapor provided by an outer casing 69a.

The vapor produced in the evaporator 70 has substantially the same alcoholic content as the vapor in the distilling-rectifying unit 3 of the third column and thus it is conveyed to the dome 24 of that column, Fig. 3.

For such arrangements as have not been specifically described in connection with the plant of Figs. 2 and 3, reference may be made to the previously described plant of Fig. 1. The vapor produced in the distilling-rectifying unit 1 of the first column descends through annular space 7 to the lower part of rectifying unit 2 and then ascends the rectifying unit 2. It leaves the unit 2 through tube 33a and is conducted to the distilling-rectifying unit 3a of the second column where it condenses, and the condensate thereof is used to rectify the vapors produced in the unit 4a second column. The part of the vapors which has not been condensed in unit 3a is conducted to the dome 24a where it combines with the vapors yielded from unit 3a. The combined vapors then move downwardly through the passage 25a to the rectifying unit 4a, through the unit 4a and then out through tube 33 to the third column where a similar operation takes place in connection with the units of that column.

A slight portion of the vapor produced in the second column is withdrawn from tube 33 at a point 34 therealong and is conducted through tube 35 to the vapor injection box 36 of the fourth column, Fig. 3, from which it is injected into the distilling-rectifying unit 48 of that column.

The vapors of the third column, however, as above described, are supplemented with the vapors of the low content liquid from the fourth column and evaporator 70, and entering through tube 74. Once the vapors of the third column are rectified, they are passed by way of tube 37 to condenser 107 of the fourth column, Fig. 3. The condenser 107 is divided into two parts. The vapor first traverses the lower part and then the upper part. The less rich condensate is withdrawn through tube 43 while the more rich condensate is withdrawn through tube 41. The vapor not condensed passes through tube 85 to rectifying unit 50 where it joins with vapors coming from distilling-rectifying unit 48 to be rectified in unit 50.

The heat from vapor in the condenser 107 is transferred to water in the surrounding evaporator 38. The vapor from the water in the evaporator passes to the distilling-rectifying unit 48 where it condenses and returns through tube 39 to the lower part of the evaporator 38.

Regulators as shown in the drawing may be used to control the withdrawals of the various condensates. When desired they may be used with other parts of the apparatus as for example in connection with the rectifying units, but are not being shown in drawings as it would overcrowd them.

Referring now to Figs. 4, 5, 6 and 7 there is a detail showing of a distilling-rectifying unit. The unit is in the form of a calender and comprises tubes 76 joined together at their ends by upper and lower head plates and surrounded by a casing 78a. Over the top of the casing is a dome 24 supporting a funnel 79. Above the funnel is the feeder tube 8 entering to one side of the dome and then extending downwardly to the funnel 79. About the tube 8 is a helix 80 forming a centrifugal separator of tubes 8 and 24 and traversed by vapor going up through the dome 24 and serving to relieve the vapor of its liquid carry-over. The liquid carry-over is forced against the walls due to centrifugal action and is drained off the helix and dome wall 24 by drain pipes 86 running along the dome wall and leading toward head plate 77. Dome 24 is inside of a casing 24b and spaced therefrom to provide passage 25. The vapor leaves the separator helix 80 at outlet 81 and moves down the annular passage 25 to the bottom of the rectifying unit in a manner already described.

Returning now to the distilling-rectifying unit, liquid entering tube 8 is discharged into funnel 79 which in turn directs the liquid to plate 77 on which a small layer of the liquid is retained. From this layer of liquid, it constantly drips down the tubes 76 counter to the current of vapor rising up the tubes and originating from the injection made into the lower part of the tubes by injection nozzles 82 of distributing box 87 fed by tube 75. The injected vapor swells continually as it rises in the tubes because to it is constantly added vapor resulting from the evaporation of the liquid passing down the tubes. The descending liquid is impoverished while the ascending vapor is enriched. The liquid not evaporated leaves outlet 27' controlled by a valve shown in Fig. 2 which regulates the depth of the cap liquid on the plate 77. The column of vapor that traversed the tubes 76 passes through the cap liquid and is emitted to the dome 24. The calender as viewed in Fig. 6 is divided by vertically-extending diaphragms 88 which close alternately at the bottom and top allowing the vapor to pass along opposite sides of the diaphragms.

By means of two diaphragms, right, left and middle sections are provided within the calender. Vapor from tube 33 enters the right section, moves downwardly to the bottom of the calender and passes to the left section. It rises in the left section to the top of the calender and then passes down the central section. Within the central section, the condensate is produced and collected for delivery through tube 29. A regulator 30 as shown in Fig. 1 serves to prevent the condensate from remaining in the calender and to prevent vapors from passing out the tube 29 with the condensate. A siphon may be used, if desired instead of the regulator. Vapors which are not condensed in the unit are collected by the tube 84 and delivered to the dome 24 when they mix with the vapors already within the dome.

Referring now to Figs. 8, 9 and 10, there is shown one of the rectifying units. This unit surrounds the outer casing of the distilling-rectifying unit in offset fashion, and this latter unit casing forms the inner wall of the rectifying unit 4. About the casing and cooperating with an outer casing 4' of the rectifying unit 4, is a helix 87' extending from the top of the unit 4, to the bottom thereof and providing a spiral-like space of varying radial cross-section extending throughout the height of the unit. The cross-section of the spiral path alternates from large to small in order that the velocity through the path will be increased at intervals as at the smaller cross section, whereby the solid or liquid particles will be flung against the outer casing upon expanding into the space interval having the larger cross section. The rectifying liquid enters the unit 4 through the distributing tubes 32 to direct the liquid therefrom into drain channels 89, Fig. 10, running co-extensively with the helix 87' and contrary to the movement of the steam through the rectifying unit. The liquid is injected at the bottom end of the channel and overflows a radially-extending edge 96 slightly inclined to the horizontal with low point at the inner end whereby the liquid overflows more at the inner side of the spiral path than at the outer side. However, to ensure that the overflow is distributed along the radially-extending edge 96, the radial edge may be dented or corrugated as indicated at 96a of Fig. 10.

By this arrangement the rectifying liquid flows across the path of the vapor passing through the spiral space and in a cascade fashion. The cascade of liquid is broken and atomized by the vapor which at that time is passing at high speed in the narrow cross section of the spiral path. As a result of such atomization of the liquid and vapor, a rectification of both liquid and vapor is effected.

Later due to centrifugal force the rectifying liquid is hurled or dashed against the outer wall of the unit and the part of the liquid adhering to the wall descends downwardly on the wall until it reaches the channel through which it is conducted downwardly. The portion of the rectifying liquid which does not pass directly to the channel is collected along the wall by a ladle 88 which carries it to the same channel. The liquid collected in the channel is conducted along it downwardly to a new cascade directly under the preceding one in the spiral path and cascades similarly. Several of these ladles 88 are provided for each of the channels 89. These ladles are located at a point in the spiral path a little beyond where the expansion of the vapor has ended. Since the rectifying unit is located about the distilling-rectifying unit or where one rectifying unit is located about the other the wasting of heat is avoided.

Referring now to Fig. 11, there is shown the condenser which is used with the enrichment column. The condensate from the distilling-rectifying unit collects in cylinder 111 which has the plate 78 of the calender as its base. Tube 35 feeds vapor to the distributing box 36 and tube 40 withdraws the low alcohol content liquid which comes from the distilling rectifying tubes 76. The condenser has a central cylinder 98 which extends downwardly and overlaps an upwardly-extending cylinder 99. At the location where the cylinders overlap there is provided a space into which condensate from the upper part of the condenser is collected and drained through tube 41. The outer wall 107' of the condenser 107 is of conical shape. Within the space between the conical wall and the cylinders 98 and 99 there is provided a lower helix 100 and an upper helix 103. These helices provide spiral spaces throughout the height of the condenser.

Adjacent to the conical wall the helices have ducts 101 and 104. The ducts 104 of the upper part are drained into pipe 106 by short tubes 105. The pipes 106 empty into the space between the cylinders 98 and 99 and the liquid is drained off through pipe 41. The lower part of the condenser has on the wall and extending through the ducts 101, ladles 102 for collecting such liquid as is dashed by centrifugal force against the outer wall during the passage of the vapor through the condenser.

Heated fluid is passed through a space external of the condenser and provided by a conical wall 107' and an outside cylindrical wall 38' of the evaporator. Between these walls there is extended a helix 108. Water vapor produced in this evaporator leaves the same through the space between the outer casing of the rectifying unit 2 and the cylinder 111. The condensate from such vapor collects in the cylinder 111 and is returned to the lower part of the evaporator by the tube 39.

In operation, the fluid to be condensed enters the condenser through the tube 37 and box 110. This fluid travels upwardly making all of the turns of the lower helices 100 and 103 and upon reaching the top of the condenser, such vapor which is not condensed leaves through tube 85 and passes into the lower part of the rectifying unit 50 of the same column. Centrifugal force separates the liquid from the vapor or gases and hurls it against the outside wall 107 of the condenser where it is picked up by the ladles 102 and extracted by tube 43. Such liquid as collects in the channel 101 of the helix 100 is conveyed to one or the other of the ladles 102 and likewise delivered to the bottom of the condenser.

The upper part of the condenser operates in a similar manner. The condensate collected in the channel 104 is taken by way of short tubes 105 to the vertical drains 106 and deposited into the space between the cylinders 98 and 99 from where tube 41 takes the condensate to another part of the plant to be treated. Water condensate from the evaporator 38 is carried back by tube 39 to the bottom of the evaporator.

Referring now to Fig. 16, there is shown a modified type of condenser which has greater heat transfer surface than the condenser just described. The helices have three walls instead of one as in the previous condenser. The arrangement is such as to provide two condenser sections in series, with the second section surrounding the first section. The first section has an inner wall 98' and an outer wall 154, and the second section has an inner wall 157 and an outer wall 38'. An annular space or passage 154' is provided between the walls 154 and 157.

The first section has a helix 158 of rectangular radial cross-section with its top and bottom parallel sides successively increasing in their distance apart as the helix winds from the bottom to the top of the condenser section. This is to accommodate the increase in volume of the fluid being evaporated between top and bottom parallel sides.

The remaining space between bottom and top sides decreases in radial section from top to bottom corresponding to the changing volume of condensate in the different parts of the condenser section. The bottom side 151 of the helix makes connection with the wall 154 and in order to close the circulating helix and confine the fluid to the remaining spiral space. The heating surface comprising side walls 151, 152 and 153 is thereby greatly increased.

Condensate collected in the cylinder 111 is taken through tube 39 to the box 156 from where it is withdrawn through tube 43.

The second section is made in the same manner as the first section. The vapor to be condensed enters the first condenser through tube 37 and box 110 and moves upwardly through the spiral of the first condenser. On reaching the top thereof it leaves through outlet 155 and passes downwardly between the cylindrical walls 154 and 157 in space 154' and passes through the outlet 158 to the bottom of the second section of the condenser. The vapors then pass upwardly through the second condenser section and the portion thereof which has not been condensed by the time the vapor reaches the top of the second condenser escapes through tube 85 into the lower part of the rectifying unit 50. The condensate from the first section is withdrawn through the tube 43 while the condensate for the second section which is collected in the space 162 is withdrawn through the tube 41.

Condensate from the corresponding distilling rectifying unit collected in the cylinder 111 is conveyed through tube 39 to the bottom of the first section of the condenser for passage upwardly through the spiral thereof. Upon reaching the top, the vapor produced leaves through the outlet 155 and passes to the distilling-rectifying unit 48, while the liquid is carried through tube 159 to the lower part of helix 160 of the second section.

Referring now to Fig. 12, there is shown another type of a distilling-rectifying unit. This unit differs from the type shown in Fig. 4 in that the calender is divided vertically into two parts 1 and 1a. Between the parts there is a chamber 118 having no tubes into which the tubes of the two parts face one another. The chamber 118 provides for uniformity of movement of the liquid and of the vapors through all the tubes and at the same time provides a good means by which the unit can be fed with liquids of different degrees of alcoholic content. The upper and lower tube bundles are proportioned so that the fluid traversing both bundles is of substantially the same alcoholic strength as the weak feed liquid injected by tube 120 into the chamber 118.

Referring now to Figs. 13 and 14, there is shown in detail the tank 65 in which spontaneous evaporation of alcohol is produced. Within the outer casing of the tank 65 is an inner cylindrical casing 122 having on its top a part 124a supporting a perforated plate 125. Within the cylinder 122 is a helical heater 123. The part 124a has an aperture 124 and facing this aperture and carried by the cover of the tank is a winged cone 125a the apex of which is vertically aligned with the aperture 124.

Alcohol enters cylinders 122 through the tube 59 and is retained under pressure therein due to the smallness of the aperture 124. Thus the alcohol leaves the aperture at high velocity and on doing so strikes the cone and is scattered and atomized thereby. In this condition it falls upon the plate 125 and thus through its perforations into the bottom of the tank 65 in the form of rain. Vapors leave the tank through the tube 126 connected to the cover thereof and are passed to a condenser. The alcohol collected within the tank leaves through the tube 66.

Referring now to Fig. 15, description will be made to the regulating apparatus used in the extraction of the products returned by the rectifying units. The regulator comprises a vessel having large upper and lower compartments 127 and 129 connected by a narrow or restricted tube 128. The condensate enters the upper compartment 127 through the tube 41 and its flow thereto is regulated by the valve 41v within the pipe 135 leaving the lower compartment 129. If the valve 41v is perfectly regulated the level of liquid within the regulator will remain unchanged. If the valve is excessively opened the level in the regulator will fall, whereas if it is excessively closed the level rises. The problem therefore is to maintain a constant level within the regulator. Connected to the upper compartment is a pipe 134 which extends outwardly and downwardly to a box 133. Connected to the lower compartment 129 is a pipe 130 which extends outwardly and slightly downwardly to a box 131. The boxes 131, 133 are connected together by an inclined tube 132 and along with the tube are adapted to contain mercury. Near the upper end of the tube there is located two electrodes 142 and 143, whereas near the lower end of the tube there is located electrodes 144 and 145. The level of the mercury within the inclined tube 132 indicates the level of the condensate within the regulator. When the mercury reaches the electrodes 144 and 145 the condensate is at a lower level in the tube 128 where if the mercury reaches the electrodes 142 and 143 the condensate is at the upper level within the restricted tube 128.

Each pair of electrodes is connected by wires to source wires 149 and 150. Connected with the electrodes 142, 143 is a solenoid 140, while connected with the electrodes 144, 145 is a solenoid 141. These solenoids control contacts which serve to place across the main source wires 149 and 150 a reversible motor 137 through wires 138 and 139. This motor by means of helical gearing 136 operates the valve 41v.

When the mercury is below the electrodes 144 and 145, the solenoids are inoperative and the circuit 138 connected with one of the brushes of the motor is in contact with the line 149, while the circuit 139 is in contact with the other brush of the motor and with line 150. This causes the motor to rotote in such direction as to reduce the opening of valve 41v.

When the mercury is between the pairs of electrodes as shown in the drawing, solenoid 141 is operated. The motor then ceases to move and the valve opening is normal. When the level of the mercury uses the electrodes 142, 143, the two solenoids are inoperative but the circuits are established so that the motor operates in a reverse operation in such a manner as to increase the opening of valve 41v.

Figure 17:
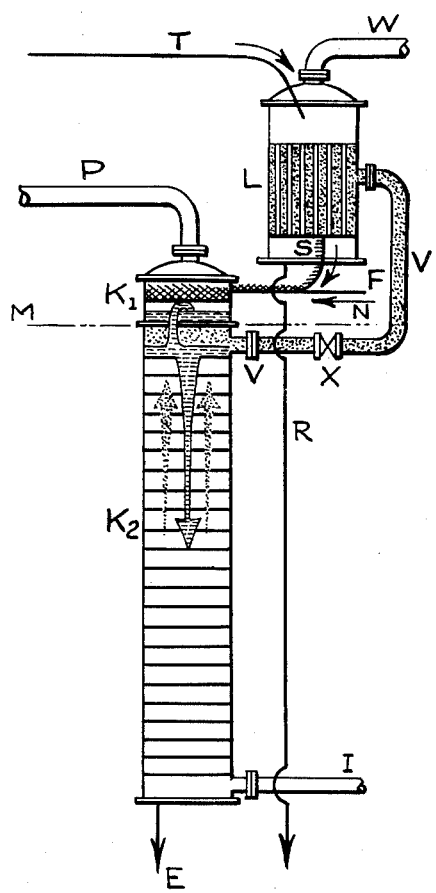

Figure 17 illustrates through a simple diagram how the invention may be practiced with the realization of important advantages. The apparatus shown is employed for performing a distillation process applicable to a non-azeotropic binary mixture. The binary mixture (which may for illustration be a mixture of alcohol and water containing 6% alcohol and 94% water) is fed to the upper end of an exhausting column, comprising a lower section or sub-column $K_2$ and an upper section or sub-column $K_1$, through a supply pipe F. The liquid flows downward through the column. A vapor comprising only the same components as the liquid feed but poorer in the more volatile component is injected at the bottom of the column through pipe I and is caused to flow upward in countercurrent to the liquid. The vapor is bubbled through the liquid at each plate. The vapor is thus caused to evaporate and extract the more volatile component progressively from the liquid as long as it ascends in the column, and to yield in compensation the component of less volatility which is liquefied. Thus the vapor is enriched as it ascends and the liquid is progressively exhausted as it descends.

As thus far described, the procedure is an entirely conventional one. The applicant's process, however, further includes the novel procedure of withdrawing mixed vapor (through pipe V) at a point where that vapor is notably richer in the more volatile component than the liquid undergoing the beginning operations (the liquid just approaching the column through the pipe F), directly liquefying the withdrawn vapor (in condenser L), and injecting the resulting condensate (through pipe S) into the liquid (in pipe F) which is undergoing the beginning operations.

In the normal exhausting column the final product of the column is a vapor extracted at the top which is richer in alcohol than the feeding liquid with which it has final contact, by an equilibrium separation. Thus, if the feeding liquid which enters the top of the column contains 6% alcohol and 94% water the product vapor will contain 39.8% alcohol and 50.2% water.

By the applicant's process the product vapor may be caused to contain at least 52.4% alcohol and 47.6% water, and this with a saving of energy expended.

The invention as illustrated in Figure 17 has for its principal object to improve the operation of separation of an exhausting column, extracting a greater proportion of residual water at the bottom, enriching the vapor product, and, at the same time making possible a reduction of the heat required for that operation.

The process applied by the invention is based upon the following observations:

The ascending vapor in a conventional column is found approximately at the outlet of each plate richer in alcohol by an equilibrium separation than the liquid feeding that plate. Consequently, in one of the lowest plates, that is, the plate in which the feeding liquid has a richness of 0.6% of alcohol, the vapor has the richness corresponding to an equilibrium separation, that is, 6% of alcohol, namely, the richness of the feeding liquid before anything is done to the liquid.

From this plate on, at any higher point of the column, the vapor has a greater richness, the higher the point the greater the richness, until a richness of 39.8% is attained at the top of the column. Consequently, vapor is found in almost all the points of the column with a richness in alcohol greater than that of the feeding liquid, and progressively greater as the top of the column is approached.

The present process involves, as has been indicated, extracting a part of that vapor, liquefying it, and mixing the resulting condensate with the feeding liquid before injecting the feeding liquid at the top of the column.

Consider, for example, a case in which the vapor extraction is effected in a proportion of 11.2 parts of vapor extracted per 100 parts of feeding liquid at the point of the column where the alcoholic richness of that vapor is 50%. (This is possible because the increasing of the richness of the feeding liquid, by the mixing of the condensed vapor with it, results in an increased richness of the vapor in the column.)

The 11.2 units of vapor extracted through tube

V contains 5.6 units of alcohol and 5.6 units of water for each 100 units of feeding liquid containing 6% of alcohol and 94% of water. The condensate of that vapor is of the same composition as the vapor itself, and consequently the mixed liquid constituting the feeding liquid of the column contains, for each 100 units of original feeding liquid 11.6 units of alcohol and 99.6 units of water, with a total of 111.20 units. In that form the feeding liquid as modified has a richness in alcohol of 10.43%, instead of 6% which was the richness of the original feeding liquid. Responding to that increase in the richness of the feeding liquid, the richness of the final product vapor increases in its turn from 39.8% to 52.4%, reducing in that form from 151.25 parts to 90.84 parts the quantity of water mixed with 100 parts of alcohol.

The heat consumption for the evaporation of that vapor is reduced for each pound of distilled alcohol from 1841 B. t .u. to 1252 B. t. u. This represents a saving of 32% of that consumption.

The increase in the alcoholic richness of the product brought about by the increased alcoholic richness of the modified feeding liquid is extended to all the plates of the column, both to the liquid of those plates and to the vapor flowing through the corresponding interplate spaces, even though that increase in richness diminishes progressively as the height of the plate considered decreases. The alcoholic richness of the final vapor product being 52.4%, there must exist a point in the column, very near to the top, where the vapor has an alcoholic richness of 50%. That is the point indicated by the line MN in the drawing of Fig. 17, namely, the divisory line of the sub-columns $K_1$ and $K_2$.

The 5.6 units of alcohol that are extracted through the tube V for each 100 units of original feeding liquid, mixed with 5.6 units of water, travel a closed circuit, and the proportion of water mixed with that alcohol varies during that travel in the following form:

*Movement 1.*—The 5.6 units of alcohol mixed with 5.6 units of water are extracted from the column through the tube V which conducts that mixed vapor to the condenser L where it is condensed. The corresponding condensate is extracted from that condenser in liquid state, being led through the tubes to the feeding tube F where they are mixed with the original feeding liquid.

*Movement 2.*—On being mixed in tube F with 100 units of feeding liquid, the 11.20 units of condensate absorb a sufficient part of the water of that feeding liquid to render homogeneous the resulting composite stream, said stream constituting the modified feeding liquid, and having a richness of 10.43% alcohol. Consequently, the 5.6 units of alcohol absorb 42.48 new units of water from the original feeding liquid to constitute a fraction:

|  | Alcohol | Water | Total |
|---|---|---|---|
| (a) of the definitive feeding liquid which comprises and the rest | 5.60 | 48.08 | 53.68 |
| (b) of the definitive feeding liquid being constituted by the original feeding liquid deprived of those 42.48 units of water, consequently comprising | 6.00 | 51.52 | 57.52 |
| The modified feeding liquid thus comprising | 11.60 | 99.60 | 111.20 |

The fraction (a) of the modified feeding liquid containing the considered 5.6 units of alcohol of the circuit is injected with the rest (b) of that modified feeding liquid at the top of the sub-column $K_1$ in liquid state.

*Movement 3.*—In the column, the considered 5.6 units of alcohol which are incorporated into the modified feeding liquid are evaporated and located at the line MN in vapor state, with an alcoholic richness of 50%, that is, in its original state, closing the cycle.

Movement 3 presents a problem, for which several solutions have been envisioned by the applicant. A selection must be made between these solutions according to the application of the invention.

Movement 3 represents the re-distillation in the column of the 5.6 units of alcohol previously extracted from the column, liquefied, and then mixed with the original feeding liquid. That re-distillation involves a consumption of heat. If the heat required had to be supplied from an outer source, the heat economy obtained by virtue of a higher richness of the final vapor product would be untrue, because the heat expense of the redistillation of the fluid of the circuit created by the invention would be greater than the economy obtained.

But in reality it is not necessary to resort to an outer source of heat. If we consider, in effect, that on being liquefied in the condenser L the fluid of the circuit yields an amount of heat sensibly equal to that which was supplied for evaporating it in the column, the idea immediately occurs of applying that heat yielded by the fluid in its liquefaction to heat the column, either to produce newly in the upper part of the sub-column $K_2$ that same vapor, or to produce a new vapor of equal quantity that serves the same purpose at the bottom of the sub-column $K_1$.

The several processes available to effect that recovery of the latent heat of the vapor extracted from the column through the tube V are known and applied industrially. Therefore, they are brought to the invention only as a convenient complement; the one chosen being variable according to the conditions of the industrial plant applying the invention.

Figure 18:
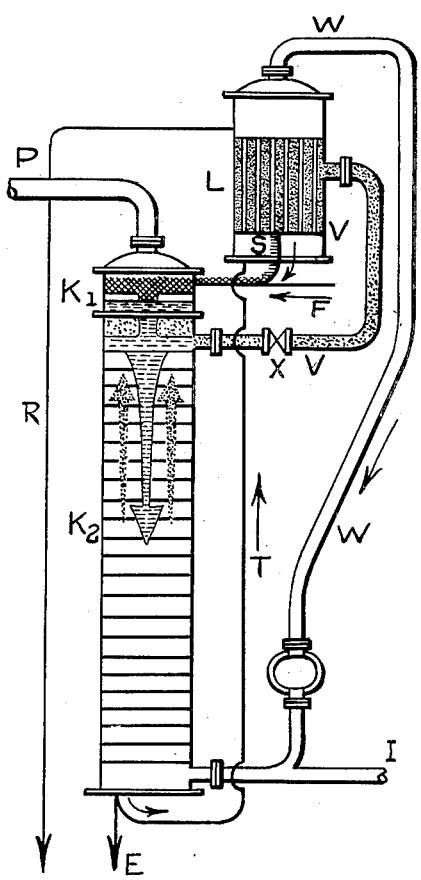

Three interesting complementary processes are schematically shown in Figs. 18, 19 and 20.

Fig. 18 represents a comparatively simple complementary process for recovering the heat yielded by the vapor extracted from the column through tube V during its liquefaction in the condenser L. In that process that heat is applied to produce steam by effecting a partial evaporation of the residual liquid flowing out from the bottom of sub-column $K_2$, and the resulting steam is incorporated as heating fluid at the bottom of sub-column $K_2$.

Possibly the pressure at the bottom of the column $K_2$ will be 1½ pounds above atmospheric pressure, that is, a temperature of 102.7° C. (216.9° F.). In the line MN the temperature is 91.65° C. The liquefying temperature in condenser L of the vapor withdrawn by tube V is then very slightly below that temperature. Consequently, in order that the heat exchange may be effected through the tubes of the condenser L, it is necessary that the evaporation of the liquid circulating along the inner part of the tubes be produced at a temperature lower than 87° C. (183.4° F.), that is, under a minimum vacuum of 12 inches of mercury (absolute pressure 18 inches of mercury).

The steam produced in that form is mixed with the steam proceeding from an outer source and injected at the bottom of the column K₂ for heating purpose. In that form the steam produced by virtue of the recovery of the latent heat of the vapor extracted from the column in the condenser L supplies the heat consumed in that column for the production of the same vapor; and the steam injected from an outer source is limited to that required by the column K₁ for the operations proper of that column, that is, for the distillation of the final vapor product issuing from the top of that column.

On the other hand, as the steam that absorbs the heat recovered in the condenser L must be produced in that condenser under a vacuum of 12 inches, and the pressure at the bottom of the sub-column K₂ where that steam must be injected is approximately 1½ pounds above atmospheric, it is necessary to aspire that vapor by pumping of the condenser L and to compress the same to 1½ pounds gauge pressure at least, in order to make it able to be used in the column. Consequently, said process requires an expense of mechanical energy to produce the compression.

That expense may be calculated and is found to be less than one-seventh part of the thermic energy saved in the exhaustion column.

Fig. 19 represents a second complementary process for recovery of the heat yielded by the vapor extracted from the column through the tube V during its liquefaction in the condenser L. In that solution the sub-columns K₁ and K₂ are separated by a horizontal wall located in the plane MN. There is extracted through tube V the total amount of vapor produced in the sub-column K₂. However, the extracted vapor is still caused to heat the sub-column K₁. The difference consists in the fact that the heating of K₁ by the vapor produced in K₂, instead of being effected by direct heat exchange as when K₁ and K₂ were freely connected, is now effected by indirect heat exchange, to which effect the condenser L is placed at the bottom of K₁ and the dome of that condenser is freely open at its upper part in order that it may constitute a part of that column. K is in that form divided into two sub-columns K₁ and K₂ operating separately, even though connected between themselves by a tube R that permits the liquid to flow downward through the total column, passing from the bottom of K₁ to the top of K₂ through the tube R.

Since that solution does not involve differences in the normal pressures of operation of the successive plates of the column (save that produced by the elevation of the sub-column K₁ by virtue of the insertion between the sub-columns of the condenser L) the temperature of the saturated steam issuing from K₂ is only slightly higher than that of the liquid flowing out at the bottom of the sub-column K₁. That slight temperature difference would not in practice permit a sufficient heat exchange, through the tubes of that section, between the vapor of the calandria, which is condensed, and the liquid of the tubes, which is evaporated. Consequently it is necessary, or at least convenient, to increase that temperature difference by means of a slight compression of the vapor. Therefore, the vapor issuing at the top of the column K₁ through tube V is slightly compressed by the compressor C that impels it to the calandria of L where it is liquefied. The condensates produced in that calandria are, the same as in Fig. 17, conducted through tube S to the feeding tube F where they are mixed with the original feeding liquid.

In this second solution the mechanical energy required for the compression is sharply reduced, because it is sufficient to raise that vapor pressure two pounds in order to permit a sufficient heat exchange. Considering the case taken as example, in which the vapor extracted through V comprises 5.6 pounds of alcohol and 5.6 pounds of steam per 100 pounds of original feeding liquid, it is calculated that the compression to two pounds above the pressure at the top of column K₂ would require less than one-fortieth of the thermal energy saved in the heating of the exhaustion column.

It is evident that the two processes of Figs. 18 and 19 are advantageous; but the second is the more advantageous of the two. Besides, the advantage of those processes increases when there is at hand cheap mechanical energy, or when the boilers used in the distilling plant are of a single type and produce steam at a pressure higher than that required for heating the column. This permits the production with that steam of the mechanical energy required and the application of the exhaust steam to heat the distilling operations.

Nevertheless, it is enough to increase the difference of height between the sub-columns K₁ and K₂ to increase the normal pressure of the vapor issuing through V and reduce consequently its grade of compression. In that case a siphon pipe or a trap must be correctly located in tube R to avoid the passage of vapor through that tube in counter-current to the liquid.

Fig. 20 finally represents the third process for recovery of the heat contained in the vapor extracted through tube V and operates like Fig. 19, causing that vapor to perform its function of heating the sub-column K₁ by indirect heat exchange by means of the addition at the bottom of the column K₁ of the condenser L as a heating section.

It has formerly been pointed out that within the case of Fig. 19, the elevation of the sub-column K₁ in relation with the level of the top of K₂ causes the pressure of the vapor issuing through V to be raised, thereby diminishing the mechanical compression required in order for that vapor to be condensed in the calandria of the condenser L.

With a sufficient elevation of K₂, the normal pressure of the vapor issuing through V may be increased sufficiently to make unnecessary the mechanical compression.

However, that elevation may be avoided and the sub-column K₂ can operate in its top with the pressure difference considered necessary in relation with the pressure of the sub-column K₁ at its bottom, provided that the liquid flowing out at the bottom of K₁ is delivered by pumping to the top of K₂. Such is the process represented in Fig. 20. In that figure the position of K₁ has been maintained above K₂; but the height difference between the two columns is not necessary and possibly the installation would be more economical if the two columns are placed at the same level. It is enough that they operate at different pressures in the form of the classical evaporating apparatus of double heat effect.

But any system requiring a pressure increase of the vapor at the top of column $K_2$, either because of the elevation of the column $K_1$ in the case of Fig. 20, or because of the pumping arrangement of Fig. 20, requires an increase of pressure of the heating steam of the column $K_2$ that enters through tube I and an increase of the pressure at all points in that column.

This third process totally avoids the waste of mechanical energy for vapor compression, replacing it by pumping of the liquid from the bottom of $K_1$ to the top of $K_2$ which is very small.

In addition, it is pointed out that there could exist cases of application constituted by the simultaneous application in combination of two of the processes of Figs. 17, 19 and 20. And finally, in distilling plants where re-distillations are effected of the products of first distillations operated at lower temperatures, the vapors extracted through tube V may be applied totally or partially for heating by indirect heat exchange such operations.

Fig. 21 discloses a procedure generally like that of Fig. 17, wherein the vapor applied to the production of the condensate intended for the enrichment of the liquid subject to distillation is, prior to its condensation, enriched through rectification by a part of said liquid. This is diagrammatically illustrated in Fig. 21, which figure is in all respects like Fig. 17, save that a column $K_3$ is inserted in tube V dividing that tube into two parts $V_1$ and $V_2$. In column $K_3$ vapor extracted through $V_1$ is operated upon by the feeding liquid that enters through tube H, and may increase the richness of that vapor to a degree greater than that of the liquid by an equilibrium separation. The operation of that column is regulated by the valves X of the vapor and Y of the liquid, thus permitting the amount of vapor withdrawn through tube V and its final richness to be varied, and the increase of richness of the liquid which feeds sub-column $K_1$ to be varied thereby to vary the richness of the product vapor of sub-column $K_1$.

The feeding liquid injected by tube H, reduced to a richness less by an equilibrium separation than the vapor withdrawn through $V_1$ by virtue of the rectification it effects to that vapor in column $K_3$, is remitted from the outlet of column $K_3$ to column K at the level of the tube $V_1$ in order to finish its exhaustion in column $K_2$.

I have described what I believe to be the best embodiments of my invention. I do not wish, however, to be confined to the embodiments shown, but what I desire to cover by Letters Patent is set forth in the appended claims.

I claim:

1. A distillation process applicable only to liquid distillations having as their main object to extract a more volatile given component from a liquid feed constituting a non-azeotropic binary mixture in which it is included, by means of successive operations carried out in an exhausting column, wherein the liquid to be separated is fed to the top of the column to flow through downward and a vapor comprising only the same components but poorer in the more volatile component is injected at the bottom of the column to move upward in countercurrent to the liquid, whereby the vapor is caused to evaporate and extract the intended component progressively from the liquid as long as the vapor ascends in that column, yielding in compensation components of less volatility which are liquefied, and being in that form continuously enriched in its ascension, while the liquid is progressively exhausted; that comprises withdrawing mixed vapor at a point of the column below the top plate where that vapor is notably richer in the volatile component than the liquid undergoing the beginning operations, directly liquefying the withdrawn vapor and injecting the resulting condensate into the liquid being fed into the top of the column.

2. A distillation process applicable to liquid distillations having as their main object to extract a more volatile given fluid from a liquid mixed fluid in which it is comprised by means of successive operations carried out in an exhaust column through which flows downwardly the liquid mixed fluid, and moving upwardly in countercurrent a vapor injected at the bottom of the column, whereby this vapor extracts progressively as long as ascending in that column from the descending liquid feeding fluid the pursued product, yielding in compensation components of less volatility, and being in that form continuously enriched in its ascension, while the feeding liquid is progressively exhausted; said process further comprising a rectification procedure which consists in causing the vapor employed to travel in one direction in a helical space bounded by inner and outer cylindrical surfaces, causing the rectifying liquid to travel in the opposite direction through a confined space at the outer side of the helical space, causing the velocity of the vapor to be alternately increased and diminished at intervals, producing the injection of the rectifying liquid into the current of vapor in circulation, at or near to the points of maximum vapor velocity, ladling off the rectifying liquid carried along by the vapor at the outer side of the helical path at points of minimum vapor velocity, and emptying the ladled liquid into the main stream of the rectifying liquid.

3. A process of rectification forming part of a general operation of distillation, of the kind described in my foregoing claim 2, whereby the injection of the rectifying liquid into the current of vapor is effected by having such liquid drop from the upper to the lower wall of its circuit forming cascade.

4. A process of rectification forming part of a distillation operation, of the kind described in my foregoing claim 3, wherein the injection of the rectifying liquid is effected in the direction of the movement of the working vapor.

5. A distillation process applicable to liquid distillations having as their main object to extract a more volatile given component from a liquid feed constituting a binary mixture in which it is included, by means of successive operations carried out in an exhausting column, wherein the liquid is caused to flow downward through the column and a vapor is injected at the bottom of the column and caused to move upward in countercurrent relation to the liquid, whereby the vapor is caused to evaporate and extract the intended component progressively from the liquid as long as the vapor ascends in the column and to yield components of less volatility which are condensed, the vapor being thereby continuously enriched in its ascension, while the liquid is progressively exhausted; that comprises introducing a mixed fluid comprising a first part of the original feed at the top of the exhausting column, passing the final product vapor of said exhausting column into a main rectifying column in order to enrich that vapor; withdrawing vapor at a point of said exhausting column below the level at which the liquid is introduced, enriching that vapor through rectification in a second rectifying column by applying as rectifying liquid the remainder of the original feed; condensing this enriched vapor; feeding the resulting condensate into an intermediate point or level of the main rectifying column; and combining the final reflux of the main rectifying column with the first part of the original feed for introduction into the exhausting column.

6. A distillation process applicable to liquid distillations having as their main object to extract a more volatile given component from a liquid feed constituting a binary mixture in which it is included by means of successive operations carried out in an exhausting column, wherein that liquid is caused to flow downward and a vapor is injected at the bottom of the column and caused to move upward in countercurrent relation to the liquid, whereby the vapor is caused to evaporate and extract the intended component progressively from the liquid as long as the vapor ascends in the column and to yield components of less volatility which are condensed, the vapor being thereby continuously enriched in its ascension, while the liquid is progressively exhausted, and the total stream of vapor ascending the column is withdrawn at a point of said column where the vapor is notably richer than the liquid feed in the more volatile component, the withdrawn vapor is condensed and the resulting condensates are injected in the feeding binary mixture; that comprises dividing the operation of exhaustion precisely at the point where the vapor extraction takes place into two operational phases effected in separated partial columns, the phase of final exhaustion being operative with higher pressure than the phase of initial exhaustion; feeding a mixed liquid comprising the original feed into the top of the phase of initial exhaustion; pumping the liquid residue at the bottom of the phase of initial exhaustion to feed it into the top of the phase of final exhaustion; supplying steam at the bottom of the phase of final exhaustion for the purpose of heating; condensing the product vapors of the phase of final exhaustion in indirect heat exchange with the liquid descending in the phase of initial exhaustion to produce vapor in said phase of initial exhaustion; mixing the resulting condensate with the original feed in order to produce the mixed liquid fed into the partial column of initial exhaustion; and withdrawing the product vapors from the top of the phase of initial exhaustion as final product.

7. A distillation process as set forth in claim 6 wherein the exhausting column is divided into more than two phases, the several phases being operated at progressively higher pressures and run over downwardly from the phase of lowest pressure to the phase of highest pressure by the feeding liquid to be exhausted; which comprises feeding the original liquid feed mixed with another liquid into the top of the phase of lowest pressure; withdrawing at the bottom of each phase its liquid residue and pumping said residue as feeding liquid into the top of the phase of immediately higher pressure, except in the phase of highest pressure where the liquid residue is removed from the system; supplying steam at the bottom of the phase of highest pressure for heating; passing the vapors produced in each phase other than the phase of lowest pressure in indirect heat exchanging relation with the liquid running downward in the phase of immediately lower pressure wherein said vapors are condensed and other vapors are produced, mixing said condensates with the original feed in order to produce the liquid designed to feed the phase of lowest pressure; and withdrawing the vapor product at the top of the partial column of initial exhaustion as the final product.

8. The method applied to a distillation process as set forth in claim 6 wherein the final product vapors of the whole exhausting column are operated in an enrichment column comprising a redistilling unit and a rectifying unit operating at a pressure lower than that of the phase of lowest pressure of the exhausting column, which comprises condensing the final product vapors of the exhausting column in indirect heat exchange with the liquid of the re-distilling unit of the enrichment column, operating that condensation fractionally; feeding the resulting low content condensate mixed with other liquid at the top of the redistilling unit of the enrichment column; pumping the liquid residue of said distillation and returning it to the point of the exhausting column where the liquid operated upon corresponds to it in composition; passing the product vapors of the redistilling unit of the enrichment column into its rectifying unit to enrich said vapors; passing the high content condensates of the final product vapors of the exhausting column into said rectifying unit as rectifying liquid; and mixing the final reflux of that rectifying unit with the low condensates to produce the liquid for feeding the redistilling unit of the enrichment column.

9. A distillation process applicable to liquid distillations having as their main object to extract a more volatile given fluid from a liquid feed constituting a binary mixture in which it is included, by means of successive operations carried out in an exhausting column, wherein the liquid is caused to flow downward through the column and a vapor is injected at the bottom of the column and caused to move upward in countercurrent relation to the liquid, whereby the vapor is caused to extract the intended fluid progressively from the liquid as long as the vapor ascends in the column, and to components of less volatility, the vapor being thereby continuously enriched in its ascension, while the liquid is progressively exhausted; the exhausting operation being divided into various successive phases, each phase including a partial exhausting column and a column designed to enrich the vapor produced in the partial exhausting column of the same phase; said process including the passing of a mixture comprising a part of the original feed into the top of the partial column of the phase of initial exhaustion to feed said column, extracting the distilland from the bottom of each partial exhausting column, feeding that distilland mixed with other liquid into the top of the partial exhausting column of the phase of next greater exhaustion, excepting the distilland extracted from the bottom of the phase of greatest exhaustion which is removed from the system; passing the product vapor of each partial exhausting column in the rectifying column of the same phase where said vapor is enriched; condensing said enriched vapor in indirect heat exchange with the liquid of the column of the next phase of lesser exhaustion where vapor is produced, excepting the enriched vapor produced by the phase of least exhaustion which is withdrawn as final product; passing said condensates as rectifying liquid into the rectifying columns of the phases wherein they were respectively produced and into the rectifying columns of the phases of lesser exhaustion; injecting the rest of the original feed as rectifying liquid in the rectifying columns of the last phases of the exhaustion; and mixing the final reflux of each rectifying column with the liquid designed to feed the exhausting column of the same phase in order to produce the feeding liquid of said phase.

10. The method as set forth in claim 9 wherein the condensation of the vapors produced in a phase occurs fractionally, and two condensates issuing from that operation are separated; which comprises partially condensing the vapors referred to in indirect heat exchange with the liquid of the partial exhausting column of the next phase of lesser exhaustion to produce condensate of low content, condensing the enriched remaining vapors in indirect heat exchange with the liquid of a partial exhausting column of a phase of still lesser exhaustion to produce condensate of high content; passing the condensate of low content as rectifying liquid into the rectifying column of the phase where they were condensed and passing the condensate of high content as rectifying liquid into the rectifying column of lesser exhaustion where they were condensed.

11. A distillation process applicable to liquid distillations having as their main object to extract a more volatile given fluid from a liquid feed constituting a binary mixture in which it is included, by means of successive operations carried out in an exhausting column, wherein the liquid is caused to flow downward through the column and the vapor is injected at the bottom of the column and caused to move upward in countercurrent relation with the liquid, whereby the vapor is caused to extract the intended fluid progressively from the liquid as long as the vapor ascends in the column and to yield components of less volatility, the vapor being thereby continuously enriched in its ascension, while the liquid is progressively exhausted, said process including the effecting of the exhaustion of the total feed in various apparatus each of which comprises two columns, namely, a first exhausting column and a second enrichment column which rectifies the vapor produced in the first, except the last apparatus which comprises only an exhausting column; injecting part of the original feed mixed with other liquid into the top of the exhausing column of the first apparatus and the remainder as rectifying liquid at successively higher levels into the enrichment columns of the other apparatus; extracting the distilland from the bottom of the exhausting column of each apparatus, mixing that distilland with other liquids and feeding said mixture into the exhausting column of the following apparatus, except the distilland of the last apparatus which is removed from the system; supplying steam for the purpose of heating at the bottom of the exhausing column of the last apparatus; condensing the rectified product vapors of each apparatus in indirect heat exchange with the liquid descending along the exhausting column of the preceding apparatus and passing said condensates as rectifying liquid into the enrichment column of the same apparatus and into the enrichment columns of some part, at least, of the preceding apparatus; and mixing the final reflux of each enrichment column with the other liquids enroute to the exhausting column of the same apparatus.

12. A distillation process of the kind described in preceding claim 11 wherein there is provided for enriching the final product vapor of the exhausting column an enrichment apparatus comprising a re-distillation column, the liquid residue of said re-distillation column being returned to the exhausting column and mixed with the liquid operated in said column.

13. A distillation process of a binary mixture which comprises feeding a mixed liquid to and causing the liquid to flow downward through a first exhaustion zone, withdrawing the distilland at the bottom of the zone and feeding that distilland to and causing it to flow downward through a second exhaustion zone; withdrawing the distilland at the bottom of this second exhaustion zone, and removing it from the system; supplying steam at the bottom of the second zone for the purpose of heating; withdrawing vapors above the location of the feed in the second exhaustion zone; condensing these product vapors in indirect heat exchange with the liquid operated upon in the first exhaustion zone to produce vapors in said zone; withdrawing the final product vapors of the first zone as final product; and mixing the condensed product vapor of the second exhaustion zone with the original feed to provide an enriched mixed liquid which is the mixed liquid fed to the first exhaustion zone.

14. A distillation process of a binary mixture which comprises feeding mixed liquid to and causing the liquid to flow downward through a first exhaustion zone, withdrawing the distilland at the bottom of the zone and feeding that distilland to and causing it to flow downward through a second exhaustion zone; withdrawing the distilland at the bottom of the second exhaustion zone and removing it from the system; supplying steam at the bottom of the second exhaustion zone for the purpose of heating; withdrawing vapors from the second exhausting zone at a point above the level at which distilland is fed to the second exhaustion zone; condensing these product vapors in indirect heat exchange with the liquid operated upon in the first zone to produce vapors in said first zone; withdrawing vapors from the first zone at a point above level at which liquid is fed into the first zone, passing these product vapors into an enrichment column added to the first zone and withdrawing these enriched product vapors of the first zone as final product; feeding the condensed product vapors of the second zone as rectifying liquid into the enrichment column of the first zone, and mixing the final reflux of said enrichment column with the original feed entering the system to provide the mixed liquid used for feeding the first exhaustion zone.

15. A distillation process of a binary mixture which comprises feeding mixed liquid to and causing the liquid to flow downward through a first exhaustion zone; withdrawing the distilland at the bottom of the zone; mixing said distilland with other liquid and feeding that mixture to and causing it to flow downward through a second exhaustion zone; withdrawing the distilland at the bottom of the second exhaustion zone and removing it from the system; supplying steam at the bottom of the second exhaustion zone for the purpose of heating; withdrawing vapors from the second zone at a point above the level at which distilland is fed to the second exhaustion zone; passing these product vapors through an enrichment column added to the second zone; condensing these enriched vapors in indirect heat exchange with the liquid operated upon in the first zone to produce vapors in said zone; withdrawing the product vapors of the first zone as a final product from a point above the level at which liquid is fed to the first zone; furnishing a portion of the original feed entering the system as rectifying liquid into the enrichment column of the second zone, and adding the final reflux of this enrichment column to the liquid fed to the second exhaustion zone; and mixing the condensed enriched product vapors of the second zone with the remainder of the original feed entering the system to produce the mixed liquid fed to the first exhausting zone.

16. A distillation process of a binary mixture which comprises feeding mixed liquid to and causing the liquid to flow downward through a first exhaustion zone; withdrawing the distilland at the bottom of the zone; mixing said distilland with other liquid and feeding that mixture to and causing it to flow downward through a second exhaustion zone; withdrawing the distilland at the bottom of the second exhaustion zone and removing it from the system; supplying steam at the bottom of the second exhaustion zone for the purpose of heating; withdrawing vapors from the second exhaustion zone at a point above the level at which distilland is fed to the second exhaustion zone; passing these product vapors through an enrichment column added to the second zone; condensing these enriched vapors in indirect heat exchange with the liquid operated upon in the first zone to produce vapors in said zone; withdrawing product vapors from the first zone at a point above the level at which liquid is fed to the first zone and passing these product vapors through an enrichment column added to the first zone; withdrawing said enriched vapors as final product; feeding a portion of the original feed entering the system as rectifying liquid to the enrichment column of the second zone and mixing the final reflux of said enrichment column with the distilland extracted from the first zone for producing the mixture fed to the second exhausting zone; feeding the condensed enriched product vapors of the second zone as rectifying liquid into the enrichment column of the first zone; and mixing the final reflux of said enrichment column with the remainder of the original feed entering the system for use as the mixed liquid fed to the first exhaustion zone.

17. A distillation process of a binary mixture as claimed in claim 16 which further comprises passing the final vapor products of the first exhaustion zone into the heating section of a redistillation column where said vapors are condensed fractionally; feeding a mixed liquid into the top of the redistillation column; passing the product vapors of that redistillation column through a final enrichment column; withdrawing the distilland of the redistillation column and feeding it as rectifying liquid into the enrichment column of the first exhaustion zone; feeding enriched condensate of the final product vapors of the first exhaustion zone as rectifying liquid into the final enrichment column; mixing the poorer condensate of the final product vapors of the first exhaustion zone with the final reflux of the final enrichment column; and using this mixture as the mixed liquid to be fed into the redistillation column.

18. A distillation process of a binary mixture which comprises feeding mixed liquid to and causing the liquid to flow downward through a first exhaustion zone; withdrawing the distilland at the bottom of that zone; feeding a part of that distilland mixed with an original feed entering the system and with another liquid into the top of a second exhaustion zone; withdrawing the distilland at the bottom of the second exhaustion zone, mixing said distilland with the remainder of the distilland extracted from the first exhaustion zone and feeding said mixture into the top of a third exhaustion zone; withdrawing the distilland at the bottom of the third exhaustion zone and removing it from the system; supplying heating steam at the bottom of the third zone; condensing the product vapors of the third zone in indirect heat exchange with the liquid operated upon in the second exhaustion zone to produce vapors in said zone; condensing the product vapors of the second zone in indirect heat exchange with the liquid operated upon in the first exhaustion zone to produce vapors in said zone, withdrawing the product vapors of the first zone as final product; mixing the condensed product vapors of the third zone with distilland from the first zone and with a part of the original feed to provide the mixed liquid fed into the second zone, and mixing the condensed product vapors of the second zone with the remainder of the original feed entering the system to produce the mixed liquid fed into the first zone.

19. A distillation process of a binary mixture which comprises feeding mixed liquid to and causing the liquid to flow downward through a first exhaustion zone; withdrawing the distilland at the bottom of that zone; feeding a part of that distilland mixed with an original feed entering the system and with another liquid into the top of a second exhaustion zone; withdrawing the distilland at the bottom of the second exhaustion zone, mixing said distilland with the remainder of the distilland extracted from the first exhaustion zone and feeding said mixture into the top of a third exhaustion zone; withdrawing the distilland at the bottom of the third exhaustion zone, and removing it from the system; supplying heating steam at thhe bottom of the third zone; condensing the product vapors of the third zone in indirect heat exchange with the liquid operated upon in the second exhaustion zone to produce vapors in said zone; condensing the product vapors of the second zone in indirect heat exchange with the liquid operated upon in the first exhaustion zone to produce vapors in said zone; withdrawing the product vapors of the first zone; passing the product vapors of the first zone into an enrichment column added to said zone and withdrawing said enriched vapors as final product; feeding the condensed product vapors of the second zone as rectifying liquid into the enrichment column added to the first zone; mixing the final reflux of said enrichment column with the remainder of the original feed entering the system to produce the mixed fluid fed into the first exhaustion zone and mixing the condensed product vapors of the third zone with distilland from the first zone and with a part of the original feed to provide the mixed liquid fed into the second zone.

20. A distillation process of a binary mixture which comprises feeding a mixed liquid to and causing the liquid to flow downward through a first exhaustion zone; withdrawing the distilland at the bottom of that zone; feeding a first part of that distilland mixed with an original feed entering the system and with another liquid into the top of a second exhaustion zone, withdrawing the distilland at the bottom of the second exhaustion zone, mixing said distilland with the remainder of the distilland extracted from the first exhaustion zone, and feeding said mixture into the top of a third exhaustion zone; withdrawing the distilland at the bottom of the third exhaustion zone and removing it from the system; supplying heating steam at the bottom of the third zone; condensing the product vapors of the third exhaustion zone in indirect heat exchange with the liquid operated upon in the second zone to produce vapors in said zone; passing the product vapors of the second zone into an enrichment column added to said zone; condensing those enriched vapors of the second zone in indirect heat exchange with the liquid operated upon in the first exhaustion zone to produce vapors in said zone; passing the product vapors of the first zone into an enrichment column added to said zone and withdrawing said enriched vapors as final product; feeding the condensed enriched product vapors of the second exhaustion zone as rectifying liquid into the enrichment column of the first exhaustion zone; mixing the final reflux of said enrichment column with the remainder of the original feed entering the system to produce the mixed fluid fed into the first exhaustion zone; feeding the condensed product vapors of the third zone as rectifying liquid into the enrichment column of the second exhaustion zone and mixing the final reflux of said enrichment column with distilland from the first zone and with the first part of the original feed to provide the mixed liquid fed into the second exhaustion zone.

21. A distillation process of a binary mixture which comprises feeding mixed liquid to and causing the liquid to flow downward through a first exhaustion zone; withdrawing the distilland at the bottom of that zone; feeding a part of that distilland mixed with an original feed entering the system and with another liquid into the top of a second exhaustion zone; withdrawing the distilland at the bottom of the second exhaustion zone, feeding said distilland mixed with the remainder of the distilland extracted from the first exhaustion zone and with other liquid and feeding said mixture into the top of a third exhaustion zone; withdrawing the distilland at the bottom of a third exhaustion zone and removing it from the system; suplying heating steam at the bottom of the third zone; passing the product vapors of the third zone into an enrichment column added to said zone, condensing these enriched vapors of the third zone in indirect heat exchange with the liquid operated upon in the second exhaustion zone to produce vapors in said zone; passing the product vapors of the second zone into an enrichment column added to said zone, condensing these enriched vapors of the second exhaustion zone in indirect heat exchange with the liquid operated upon in the first exhaustion zone to produce vapors in said zone; passing the vapor products of the first exhaustion zone into an enrichment column added to said zone and withdrawing said enriched vapors as final product; feeding part of the original feed entering the system as rectifying liquid into the enrichment column of the third exhaustion zone and mixing the final reflux of said enrichment column with distilland from the second zone and with a part of the distilland from the first zone to provide the mixed liquid fed to the third exhaustion zone; feeding the condensed enriched vapors of the third exhaustion zone as rectifying liquid into the enrichment column of the second exhaustion zone, and mixing the final reflux of said enrichment column with distilland from the first zone and with a part of the original feed to provide the mixed liquid fed to the second exhaustion zone; feeding the condensed enriched vapors of the second exhaustion zone as rectifying liquid into the enrichment column of the first exhaustion zone, and mixing the final reflux of said enrichment column with the remainder of the original feed entering the system to produce the mixed fluid fed to the first exhaustion zone.

22. A distillation process of a binary mixture whereby the exhausion of a main portion of the original feed is performed by running said portion through successive exhaustion zones, supplying steam to heat the zone of final exhaustion, and heating every other zone by indirect heat exchange with vapor produced in a zone or zones of greater exhaustion while condensing the vapor by such heat exchanged and wherein the first zone comprises a rectifying column designed to enrich its vapor products; said process comprising passing the enriched product vapors of the first exhaustion zone, namely, the final product vapors of an exhausting column into the heating section of a redistillation column wherein said vapors are condensed fractionally while vapors are produced as a consequence of such condensation in the redistillation column; feeding the low concentration condensates of the vapors produced in the exhaustion column, mixed with other liquid, into the top of the re-distillation column; passing the product vapors of the re-distillation column into a rectifying column added to said re-distillation column; feeding the highly concentrated condensate of the final product vapors of the exhaustion zone as rectifying liquid in said rectifying column; mixing the final reflux of said rectifying column with the low concentration condensates of the vapors produced in the exhausting column to provide the mixed liquid fed into the redistillation column, and feeding the distilland of the redistillation column as rectifying liquid into the rectifying column added to the first exhaustion zone.

23. A distillation process applicable only to liquid distillations having as their main object to extract a more volatile given component from a dilute liquid feed constituting a non-azeotropic binary mixture in which it is included, by means of successive operations carried out in an exhausting column, wherein the liquid to be separated is fed to the top of the column to flow through downward, and a vapor comprising only the same components but poorer in the more volatile component is injected at the bottom of the column to move upward in countercurrent to the liquid, whereby the vapor is caused to evaporate and extract the intended component progressively from the liquid as long as the vapor ascends in the column, and to yield in compensation components of less volatility which are liquefied, and being in that form continuously enriched in its ascension while the liquid is progressively exhausted; that comprises applying heat to the lower part of the exhausting column, mixing the liquid feed, before any of it enters the top of the exhausting column, with other liquid L in order to produce a mixture M; feeding a part of said mixture M into the top of the exhausting column; withdrawing a vaporous side stream from the column at a point below the top thereof, introducing said side stream into the bottom of a rectifying column as the source of heat of the rectifying column, applying the remaining part of the mixture M, which is not fed to the exhausting column as rectifying liquid in the rectifying column, said vapor being enriched in the rectifying column to a degree greater by an equilibrium separation than the richness of said mixture M; removing the enriched vapor from the top of the rectifying column, condensing the enriched vapor, applying the resulting condensate as said other liquid L to be mixed with the liquid feed to produce the mixture M; removing the rectifying liquid from the base of the rectifying column and injecting it into the exhausting column at the level at which the vapor is withdrawn for enrichment in the rectifying column, removing an enriched, recovered vapor from the top of the exhausting column, and removing the residue liquid from the base of the exhausting column.

24. In a method of distillation comprising a plurality of exhausting phases, said phases being connected in multiple effect, in which the lower portion of each phase is heated by indirect heat exchange by vapor produced in a preceding phase, the improved procedure which comprises causing the liquid to be exhausted in a phase to run directly downward in a single pass divided into numerous long, confined, parallel streams, heating each stream continuously by indirect heat exchange, injecting vapor at the bottom of each stream, and extracting the exhausted liquid at the bottom.

JUAN LOUMIET ET LAVIGNE.

References Cited in the file of this patent

UNITED STATES PATENTS

| Number | Name | Date |
|---|---|---|
| 111,791 | Turners | Feb. 14, 1871 |
| 476,930 | Schafhaus | June 14, 1892 |
| 467,430 | Paalzow | Jan. 19, 1892 |
| 534,719 | Mallet et al. | Feb. 26, 1895 |
| 699,830 | Best | May 13, 1902 |
| 798,150 | Wolgamott | Aug. 29, 1905 |
| 1,199,371 | Guillaume | Sept. 26, 1916 |
| 1,478,206 | Bethune | Dec. 18, 1923 |
| 1,582,899 | Cassidy | May 4, 1926 |
| 1,735,980 | Sadtler | Nov. 19, 1929 |
| 1,766,699 | Staden et al. | June 24, 1930 |
| 1,829,949 | Vandegrift | Nov. 3, 1931 |
| 1,835,848 | Clapp | Dec. 8, 1931 |
| 1,879,847 | Gorhan | Sept. 27, 1932 |
| 1,912,010 | Ricard et al. | May 30, 1933 |
| 1,936,836 | Gorhan | Nov. 28, 1933 |
| 1,943,106 | Burnham | Jan. 9, 1934 |
| 1,957,818 | Carney | May 8, 1934 |
| 2,081,189 | Wiezevich | May 25, 1937 |
| 2,152,164 | Wentworth | Mar. 28, 1939 |
| 2,163,303 | Bonotto | June 20, 1939 |
| 2,182,566 | Lavigne | Dec. 5, 1939 |
| 2,230,253 | Lavigne | Feb. 4, 1941 |
| 2,240,752 | Bogart | May 6, 1941 |
| 2,274,050 | Etwarick | Feb. 24, 1942 |
| 2,274,801 | Mills | Mar. 3, 1942 |
| 2,280,210 | Zellhoeffer | Apr. 21, 1942 |
| 2,358,559 | Clemens | Sept. 19, 1944 |
| 2,391,541 | Belchetz | Dec. 25, 1945 |
| 2,413,245 | Reed et al. | Dec. 24, 1946 |
| 2,423,205 | Rowntree | July 1, 1947 |
| 2,444,893 | Lake | July 6, 1948 |

FOREIGN PATENTS

| Number | Country | Date |
|---|---|---|
| 202,432 | Germany | Oct. 1, 1908 |
| 157,149 | Great Britain | Apr. 10, 1922 |
| 299,075 | Great Britain | Oct. 22, 1928 |
| 17,040 | Australia | Nov. 26, 1928 |

OTHER REFERENCES

Othmer: "Vapor Re-Use Process," Ind. & Eng., vol. 28, No. 12, pages 1435–1438.

Wentworth et al.: Trans. Am. Inst. Chem. Eng., vol. 36 (1940), pages 785–797.

Separation Processes, Randal et al., Ind. and Eng. Chem., Jan. 1940, pages 125–129.